United States Patent [19]

Stamm

[11] 3,744,877

[45] July 10, 1973

[54] DARK TRACE DISPLAY DEVICE EMPLOYING UV PHOSPHOR PLUS PHOTOCHROMIC RESIN INSIDE THE DISPLAY SCREEN WHICH GENERATES COLOR BY MEANS OF TRIPLET-TO-TRIPLET ABSORPTION

[75] Inventor: Robert Franz Stamm, Stamford, Conn.

[73] Assignee: American Cyanamid Company, Stamford, Conn.

[22] Filed: June 24, 1971

[21] Appl. No.: 156,268

[52] U.S. Cl. ........ 350/160 P, 252/301.2, 260/590, 313/92, 343/17
[51] Int. Cl. ............................................. G02f 1/36
[58] Field of Search ............... 350/160 P, 83.3 UV; 313/92 R

[56] References Cited
UNITED STATES PATENTS

| | | |
|---|---|---|
| 3,635,544 | 1/1972 | Stamm et al. ................. 350/160 P |
| 3,329,648 | 7/1967 | Chopoorian ..................... 350/160 P |
| 3,453,604 | 7/1969 | Geusic et al. .................... 350/160 P |
| 3,548,236 | 12/1970 | Kiss ................................... 313/92 R |
| 3,238,841 | 3/1966 | Bjelland et al. ................. 350/160 P |
| 3,214,383 | 10/1965 | Moore et al. .................... 350/160 P |

Primary Examiner—Ronald L. Wibert
Assistant Examiner—V. P. McGraw
Attorney—Charles Joseph Fickey

[57] ABSTRACT

An information display screen viewable in high ambient light and darkness using a photochromic material capable of forming a dark trace and a luminescent trace. The photochromic material is molecularly dispensed in a rigid, transparent matrix. The photochromic materials used are polynuclear aromatic hydrocarbons and nitrogen containing heterocyclic compounds.

6 Claims, 21 Drawing Figures

INVENTOR.
ROBERT FRANZ STAMM
BY
Charles J. Vickery
ATTORNEY

INVENTOR.
Robert Franz Stamm
BY
Charles J. Fickey
ATTORNEY

INVENTOR.
ROBERT FRANZ STAMM
BY Charles J. Hickey
ATTORNEY

INVENTOR.
ROBERT FRANZ STAMM
BY
Charles J. Fickey
ATTORNEY

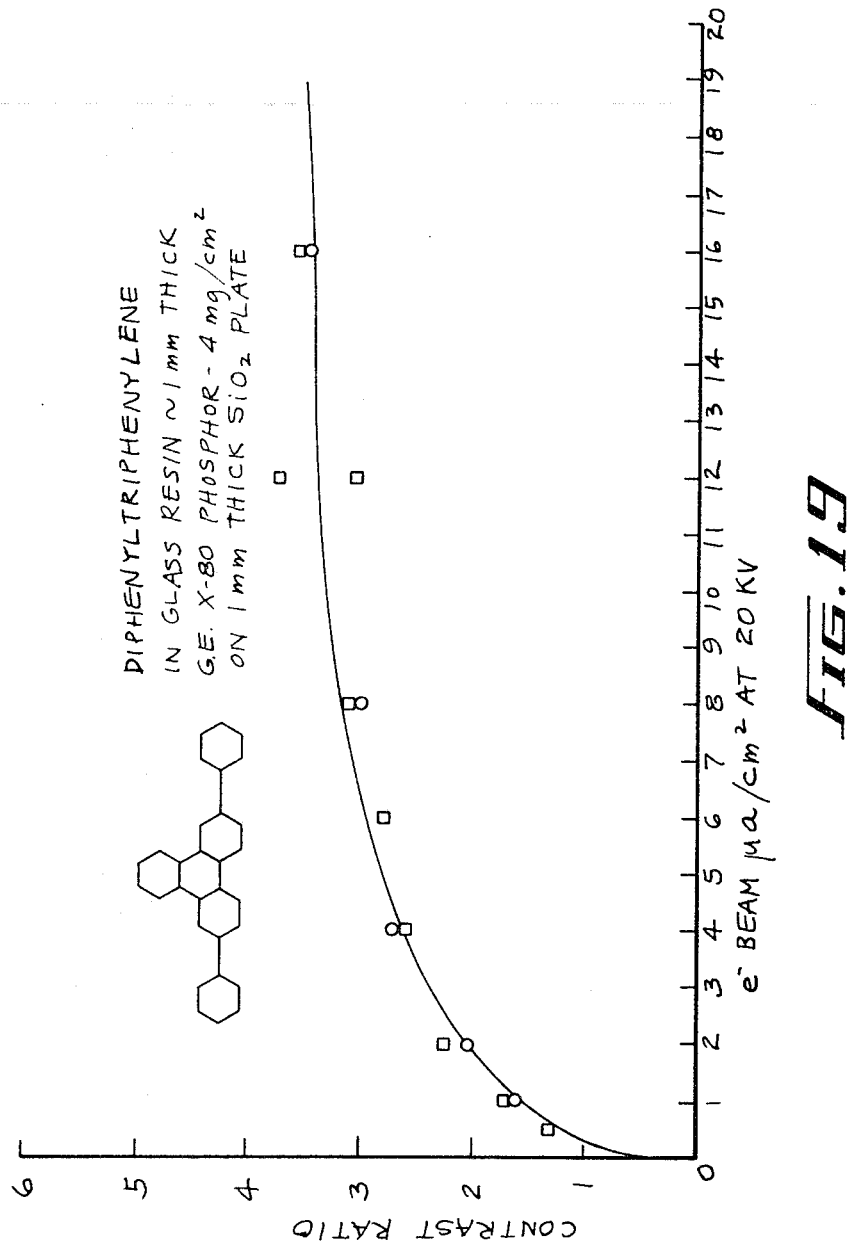

DARK TRACE DISPLAY DEVICE EMPLOYING UV PHOSPHOR PLUS PHOTOCHROMIC RESIN INSIDE THE DISPLAY SCREEN WHICH GENERATES COLOR BY MEANS OF TRIPLET-TO-TRIPLET ABSORPTION

This invention relates to a method and means for displaying real time information. It more specifically relates to a method and means for displaying information as dark traces with photochromic compounds activatable by ultraviolet radiation. It further relates to cathode ray tube display tubes or display panels making use of triplet--triplet photochromic compounds, where the image is self erasable.

Numerous types of dark trace display devices are known. Some of these are cathode ray devices known as dark trace cathode ray tubes, for example such as shown in U.S. Pat. No. 2,409,606. Such tubes make use of materials which develop color centers under electromagnetic radiation or electron beam bombardment. The color centers thus form a visible image viewable by transmitted or reflected light. Typical suitable materials for forming color centers were alkali halides. These tubes were dark trace storage tubes, i.e. the image once formed remained until erased or if it faded spontaneously it was over a period of hours. The method of erasing was usually by a heat filament in the tube, causing considerable difficulty with heat dissipation before a reuse of the tube. It will be further realized that the uses of such a tube could not include display of real time information, i.e. information continuously changing with time.

Other types of information displays in panel form are shown in U.S. Pat. No. 3,238,841 making use of photochromic materials such as spiropyrans in a plastic film. Such displays involve molecular transformations in the spiropyrans and are thus inherently slow. Moreover, these images are also storage images and have to be erased.

Cathode ray tube display devices are also well known which utilize phosphorescent screens, e.g. television or oscilloscope tubes, to display information as a glowing image in real time. These devices suffer from the disadvantage that their visibility is not good if the ambient light striking the viewing surface is very bright.

I have now discovered a display device which is a totally new concept. This device displays information as a dark trace, which is self bleaching, fading slowly with time. Moreover, the trace also has luminescent emission so that it is also visible in the dark. Thus it is possible to display real time information in high or low ambient light or in total darkness. The device makes use of photochromic compounds which are of the triplet-triplet type disclosed in Canadian Pat. No. 781,707, which are polynuclear aromatic compounds, deuterated or undeuterated including nitrogen containing heterocyclics. The photochromic activity of such compounds has been known, but not very useful due to their high activity making it necessary to use them at low temperature. However, as disclosed in the Canadian Patent, these compounds, when dispersed molecularly in a suitable rigid organic or inorganic matrix are stabilized and useful at room temperature. It has now been found that such compounds in a matrix are activatable by ultraviolet radiation. Thus by the use of a phosphor activatable by a cathode ray and emitting in the ultraviolet range, a cathode ray tube display device having the characteristics described is constructed. A variation of this device can also be made where the cathode ray tube contains only the phosphor and the photochromic material is incorporated in an external screen. In addition, a photochromic screen can be used with an ultraviolet laser and means to provide an X - Y scan and intensity variation of the ultraviolet beam to produce a dark trace image on the screen.

The dark trace images formed are visible in high ambient light as well as in the dark, and fade in from about one, to 20 or more seconds. Thus these display devices are useful for displaying real time information slowly changing with time. A particularly good application is for radar display where the required persistence of the image is of the order of a few seconds.

It is therefore an object of this invention to provide a display device, viewable in high ambient light and in darkness and which is self erasable.

A further object of the invention is to provide a dark trace display device capable of displaying real time information.

Another object is to provide a dark trace cathode ray tube capable of real time information.

A further object is to provide new triplet-triplet photochromic compounds of high efficiency for use in information display.

These and other objects of the invention will become apparent from consideration of the following description taken in conjunction with the appended claims and the drawings wherein:

Figure 1:
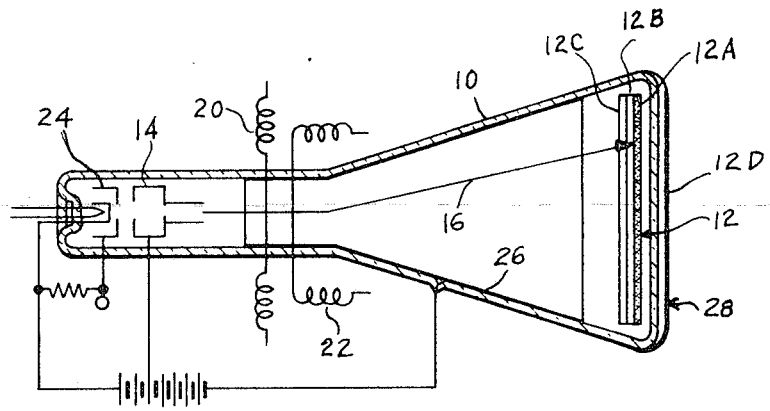
FIG. 1 is a cross-sectional view of one embodiment of a display cathode ray tube according to the invention with dark trace screen and activating screen inside the tube.

Referring to FIG. 1 the information display device comprises an evacuated tube 10 provided with a screen 12 and with means in the form of an electron gun 14 for developing a ray of electrons 16 and directing the ray at the screen 12.

Figure 2:
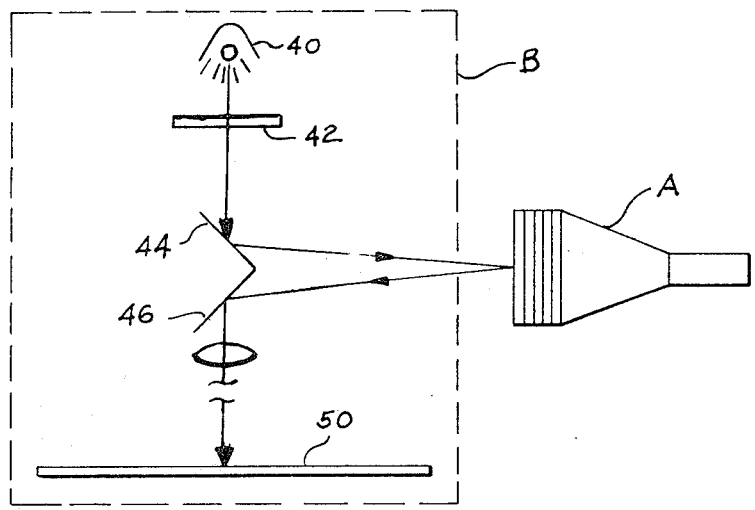
FIG. 2 is a systematic representation of a projection display system using a cathode ray tube as in FIG. 1.

The screen 12 incorporates the photochromic T'—T compounds in a matrix as a layer 12A, a layer of a U.V. emitting phosphor 12B, and an aluminum layer 12C on the side struck by the cathode ray. In addition, a dichroic layer 12D may be coated on the T'—T layer facing the UV radiation to filter out UV and reflect visible light, especially for projection systems, as shown in FIG. 2.

The ray 16 of electrons is deflected horizontally by coils 20 and vertically by coils 22 to cause it to scan the screen 12. The ray 16 is focused on the screen 12 by an anode 26 in the form of a metallic coating on the inside surface of the tube 10.

In operation, ray 16 will be made to trace over screen 12 activating the U.V. layer which emits U.V. radiation and colors the screen at the places traced to form an image. The image will begin to fade from the screen when the electron bombardment ceases, and will persist for less than one to more than 20 seconds, depending on the specific T'—T photochromic compound in the screen. The image may be viewed directly at the transparent end 28 of the tube.

In this embodiment the matrix for the PC compounds should be one that will not foul the vacuum, i.e. it does not break down and release gases. Such materials are for example Lexan polycarbonate (General Electric Co.) and glass resin Type 908 (Owens-Illinois Co.).

The photochromic materials are organic molecules molecularly dispersed in a colorless, rigid, organic polymeric or inorganic glass matrix. The thickness if from about 0.5 mm to 1.0 mm. By absorption of U.V. photons, a small percentage of the colorless molecules are converted to transient molecules which absorb in the visible spectrum. After cessation of excitation, the transients decay spontaneously and essentially unimolecularly to the colorless initial state. The time required to form the color depends on the incident flux, and with a pulsed laser emitting U.V., the color can be generated in times as short as 10 nsec. The time required for fading depends on the mean lifetime of the colored species. In a non-rigid medium (i.e., in liquid solutions), the mean lifetimes ($e^{-1}$) are generally in the milli-second region while in rigid media at room temperature, they approach values as great as 20 seconds.

Because of this spontaneous decay, the color does not require bleaching by light or heat, and white light projection systems can be employed. Contrast ratios achieved by diffuse relection are high enough to be of use in a practical sense. At 10 mW/cm² (excitation by Hgλ3650A), they range from 5:1 to 10:1 for different materials; and at 20 mW/cm², values as high as 20:1 are obtained. To the human eye, a C.R. of 6:1 is definitely better than 3:1 but 12:1 does not represent a really marked improvement over 6:1. At these levels of excitation, to the eye, the sample appears to have the bulk of the color generated in less than 1 second; to an instrument, somewhat more time is required.

Figure 18:
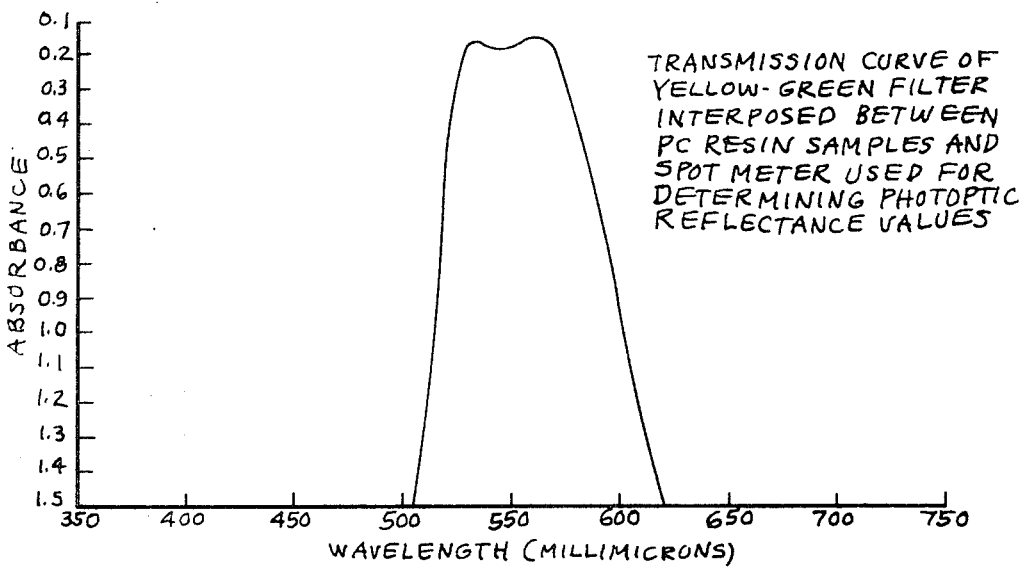

When employing excitation by a U.V. emitting phosphor, there is generally a long wave-length tail of violet to blue emission from the phosphor as well as emission of blue fluorescence from the P.C. sample. This lowers the contrast ratio. However, if a broad-band yellow green filter is interposed, this unwanted emission is largely eliminated, and the contrast ratio is improved. This improvement is much more marked to an instrument than it is to the eye. The numerical values of C.R. shown in FIGS. 7 to 17 were measured with a broad band yellow-green filter in front of the detector; the transmission curve of the filter is shown in FIG. 18.

A variety of colors can be achieved with the P.C. materials as shown in Table I.

TABLE I

| Max. Absorption | Color to the Eye |
|---|---|
| Blue | Yellow |
| BG,G,Y. | Nearly Red (Magenta with very little blue) |
| YG | Magenta |
| V,G, Y-Or | Lilac (leaks Blue and Red) |
| V,R | Green (leaks Blue and Green) |
| Most of Visible | Blue-Gray |
| " | Green-Gray |
| " | Gray |

(2 or 3 components for the last three)

In order to achieve a large contrast to the human eye, the colored molecules should have maximum absorption at 555 nm. However, many persons acquire a strong distaste for this color when requried to view it for extensive periods of time. Thus, for such applications, two or three individual compounds may be mixed in order to obtain some type of gray which is generally considered more acceptable than magenta.

The T'—T Photochromic Molecules

Suitable compounds may be those which are recited in the following classes.

CLASS I

All polynuclear aromatic hydrocarbons containing three ring or more whose hydrogen atoms contain the normal abundance (0.015%) of hydrogen of mass 2(deuterium=D), and the same hydrocarbons which have been deuterated and whose hydrogen atoms consist of about 40 percent or more of deuterium atoms.

Class II

All members of Class I which are fused or condensed polynuclear aromatic hydrocarbons containing three or more rings whose hydrogen atoms contain the normal abundance (0.015%) of hydrogen of mass 2 (deuterium=D), and the same hydrocarbons which have been deuterated and whose hydrogen atoms consist of about 40 percent or more of deuterium atoms.

CLASS III

Members of class I and II whose so-called "α-bands" are weak (for explanation of "α-bands" see "Polycyclic Hydrocarbons," Eric Clar, London, Academic Press, 1964, Vol. I, page 56 ff.), and whose hydrogen atoms contain the normal abundance (0.015%) of hydrogen of mass 2 (deuterium=D), and the same hydrocarbons which have been deuterated and whose hydrogen atoms consist of about 40 percent or more of deuterium atoms.

CLASS IV

Linear polyphenyls containing three to five rings whose hydrogen atoms contain the normal abundance (0.015%) of hydrogen of mass 2 (deuterium=D), and the same hydrocarbons which have been deuterated and whose hydrogen atoms consist of about 40 percent of deuterium atoms, which are connected in the 1-,2-, or 3-position of one terminal ring to benzophenone,

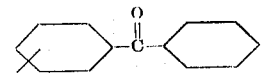

(or to some other suitable single or double energy-transfer agent shown in Table II below), by one or more intervening -CH₂- groups or by an oxygen (-O-) bridge.

CLASS V

Certain highly-benzenoid or totally benzenoid molecules (see Clar. Vol. 1, p. 34) joined together in pairs, or linked to phenyl or xenyl groups in a manner such that they are capable of assuming para-quinoidal-like structures in the triplet state and are characterized by possessing an energy greater than about 18,000 cm$^{-1}$ when in the lowest triplet state whose hydrogen atoms contain the normal abundance (0.015%) of hydrogen of mass 2 (deuterium=D), and the same hydrocarbons which have been deuterated and whose hydrogen atoms consist of about 40 percent or more of deuterium atoms.

Such compounds of class V include

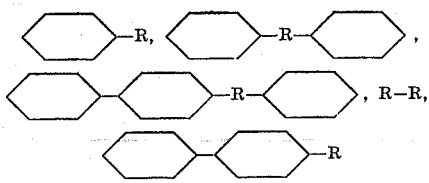

where R can be:

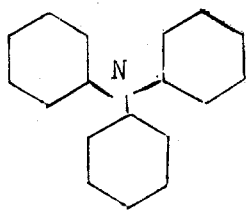

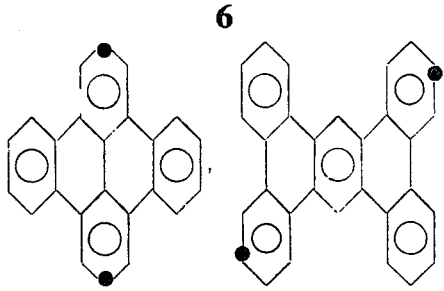

and where the possible points of phenyl or xenyl substitution are indicated by the black dots.

TABLE II

| Energy Transfer Agents Listed in Order of Magnitude of Lowest Excited Singlet Energy Level ($S_1$) | $E(S_1)$ cm$^{-1}$ | $E(T_1)$ cm$^{-1}$ | $\Phi_{ic}^b$ | $k_{ic}^b$ sec$^{-1}$ |
|---|---|---|---|---|
| 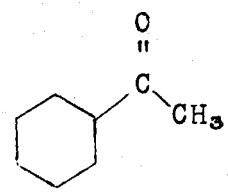 Triphenylamine $C_{18}H_{15}N$ | 30,000$^b$ | 24,500$^d$ | 0.88 | 3.7 |
| Acetophenone $C_8H_8O$ | 28,200$^b$ | 25,900$^a$ | 1.00 | ⩾1 |

TABLE II Cont.

| Energy Transfer Agents Listed in Order of Magnitude of Lowest Excited Singlet Energy Level ($S_1$) | $E(S_1)$ $cm^{-1}$ | $E(T_1)$ $cm^{-1}$ | $\Phi_{ic}^{b}$ | $k_{ic}^{b}$ $sec^{-1}$ |
|---|---|---|---|---|
| 2-Acetonaphthone $C_{12}H_{10}O$ | 27,200[a] | 20,800[a] | 0.84 | - |
| Benzophenone $C_{13}H_{10}O$ | 27,000[a] | 24,200[d] | 1.00 | $\geqslant 3$ |
| 4-Phenylbenzophenone $C_{19}H_{14}O$ | 26,800[a] | 21,200[a] | - | - |
| 2-Naphthaldehyde $C_{11}H_8O$ | 26,800[a] | 20,800[a] | - | - |
| 1-Naphthyl phenyl Ketone $C_{17}H_{12}O$ | 26,700[a] | 20,100[a] | - | - |

TABLE II Cont.
| Energy Transfer Agents Listed in Order of Magnitude of Lowest Excited Singlet Energy Level ($S_1$) | $E(S_1)$ cm$^{-1}$ | $E(T_1)$ cm$^{-1}$ | $\Phi_{ic}^{b}$ | $k_{ic}^{b}$ sec$^{-1}$ |
|---|---|---|---|---|
| 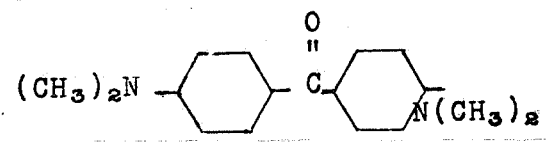<br>4,4'-bis(dimethyl-amino)benzophenone<br>$C_{17}H_{20}N_2O$ | 24,300$^b$ | 21,300$^d$ | 1.00 | - |
| 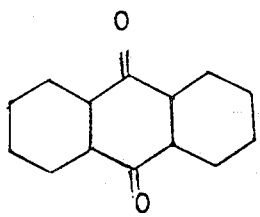<br>9,10-Anthraquinone<br>$C_{14}H_8O_2$ | 23,700$^c$ | 21,700$^d$ | 0.90 | 0.05 |
| 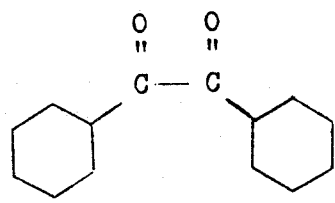<br>Benzil<br>$C_{14}H_{10}O_2$ | 23,100$^b$ | 18,900$^d$ | 0.92 | 0.04 |
| 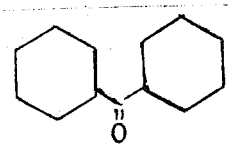<br>Fluorenone<br>$C_{13}H_8O$ | 22,500$^b$ | 18,500$^d$ | 0.93 | 0.13 |
| 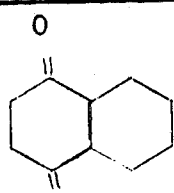<br>1,4-Naphthoquinone<br>$C_{10}H_{16}O_2$ | 21,800$^c$ | - | - | - |

TABLE II Cont.

| Energy Transfer Agents Listed in Order of Magnitude of Lowest Excited Singlet Energy Level ($S_1$) | $E(S_1)$ cm$^{-1}$ | $E(T_1)$ cm$^{-1}$ | $\Phi_{ic}^{b}$ | $k_{ic}^{b}$ sec$^{-1}$ |
|---|---|---|---|---|
| 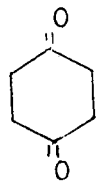<br>1,4-Benzoquinone<br>$C_6H_4O_2$ | 20,200$^c$ | 18,900$^c$ | - | - |
| 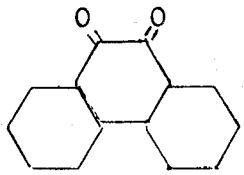<br>9,10-Phenanthroquinone<br>$C_{14}H_8O_2$ | ~20,000$^c$ | - | - | - |
| 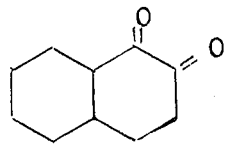<br>1,2-Napthoquinone<br>$C_{10}H_6O_2$ | ~18,000$^c$ | - | - | - |
| 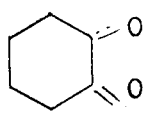<br>1,2-Benzoquinone<br>$C_6H_4O_2$ | ~15,000$^c$ | - | - | - | a. Ermolaev, J. Chim. Phys. 55, 698 (1958)
b. Hammond, J. Chem. Phys. 43, 2,129 (1965); $E(T_1)$ determined from $S_1$ — $T_1$ energy gap in this reference and from $E(T_1)$ in reference (d) below.
c. Sidman, J. Am. Chem. Soc., 78, 2,363, (1956); 78, 4,567 (1957).
d. Turro, "Molecular Photochemistry," New York, W.A. Benjamin, Inc. (1965).

$\Phi ic = \Phi_t$, Quantum yield for intersystem crossing into the triplet manifold.
$k_{ic}$, Velocity constant or frequency factor for intersystem crossing.

The use of single or double energy transfer agents for getting the T'—T photochromic compounds into the triplet state may be explained as follows:

SINGLE ENERGY TRANSFER

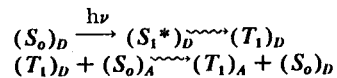

[∼∼∼indicates a non-radiative reaction or transfer of energy]. The ground state of the energy-transfer agent (ETA), the doner, is excited by UV to its lowest excited singlet state and from there undergoes fast intersystem crossing to its lowest triplet with high efficiency (100 percent in some cases). It then transfers its triplet energy "downhill" to the lowest triplet state of the acceptor which is then able to manifest T'—T absorption or T → $S_o$ emission (phosphorescence). It is necessary that the initial absorption of UV should occur through the donor (D) and that ($T_1$) be higher than ($T_1$).

DOUBLE ENERGY TRANSFER (DET)

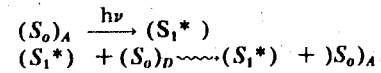

$(S_1^*)_D \rightsquigarrow (T_1)$
$(T_1)_D + (S_0)_A \rightsquigarrow (T_1)_A + (S_0)_D$ Here the initial absorption of energy occurs in the acceptor or photochromic end of the molecule which then passes its excited singlet energy "downhill" to the donor which then undergoes intersystem crossing with high efficiency to its lowest triplet state after which it transfers its triplet energy "downhill" to the acceptor which can manifest T'—T absorption or T → $S_0$ emission (phosphorescence). Here it is necessary that $(S_1^*)$ be higher than $(S_1^*)$ and that $(T_1)_D$ be higher than $(T_1)$. In comparing the two types of energy transfer, it is true to say that SET generally occurs with greater efficiency but that overall, a greater concentration of triplet molecules of species A can be achieved from a given flux of UV photons by DET because the initial act of excitation can often occur with greater efficiency.

TABLE III

 Phenanthrene

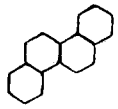 Chrysene

 Triphenylene

 Pyrene

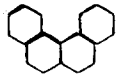 3,4-Benzophenanthrene

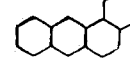 1,2-Benzanthracene

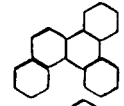 1,2-Benzochrysene

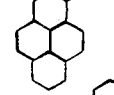 1,2-Benzopyrene

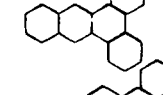 1,2-3,4-Dibenzanthracene

 Picene

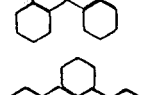 1,2-7,8-Dibenzochrysene

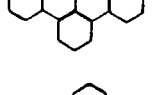 1,2-6,7-Dibenzopyrene

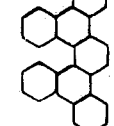 11,12-13,14-Dibenzopicene

TABLE III (Cont.)

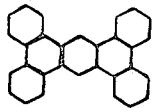 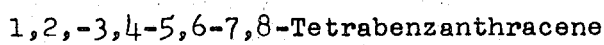

1,2,-3,4-5,6-7,8-Tetrabenzanthracene

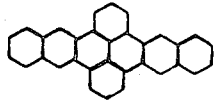 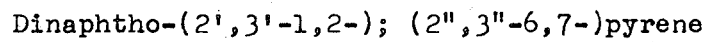

Dinaphtho-(2',3'-1,2-); (2",3"-6,7-)pyrene

 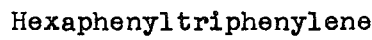

Hexaphenyltriphenylene

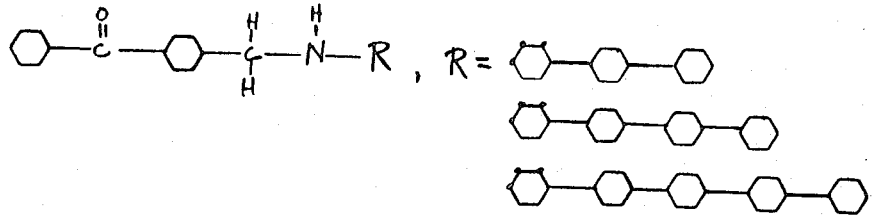

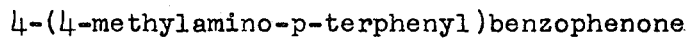

4-(4-methylamino-p-terphenyl)benzophenone

-p-quaterphenyl)

-p-quinquephenyl)

The molecules shown in Table III are examples of condensed polynuclear aromatic compounds which could be linked to benzophenone through a $CH_2$ bridge and would then be capable of undergoing double energy transfer. For all of these compounds, the lowest excited singlet lies at an energy approximately equal to or greater than that of benzophenone, and for all of them, the lowest triplet lies below that of benzophenone. Deuteration increases the mean triplet lifetimes and enhances the degree of photochromic color achievable with a steady-state light source. The last examples in Table serve to illustrate DET.

The primary absorption act occurs in the aminopolyphenyl moiety. This is followed by singlet-to-singlet transfer to benzophenone which undergoes intersystem crossing to the triplet state and then transfers its triplet energy back to the lowest triplet of the aminopolyphenyl which then manifests T'—T absorption or T → S emission. When R is p-terphenyl, the triplet color is yellow and the T'— T absorption is in the blue; for R as p-quatraphenyl, the color is pink and the T'—T absorption is in the yellow-green region; when R is p-quinquephenyl, the color is green with the T'—T absorption being in the red.

Table IV shows preferred T'—T photochromic compounds.

TABLE IV

Compounds of Preference for Dark-Trace CRT

| | Compound | Degree of Deuteration | $\tau_m$ (sec) | P.C. Color |
|---|---|---|---|---|
| 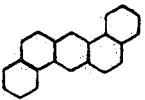 | 1,2-5,6-Dibenanthracene | 90% or better | 7.5 | Pink |
| 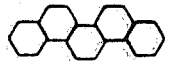 | Picene | 90% or better | 10 | Gray-Green |
| 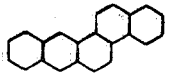 | 3,4-Benzotetraphene | 90% or better | 6.5 | Purple |
|  | 1,2-6,7-Dibenzopyrene | 90% or better | 20 | Pink |
| 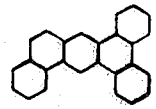 | 1,2-3,4-5,6-Tribenzanthracene | 90% or better | 19 | Pink |
|  | 1,2-Benzocoronene | 90% or better | 21 | Blue-gray |
| 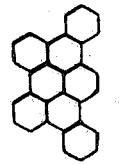 | 1,12-2,3-10,11-Tribenzoperylene | 0 | 7.5 | Tan |
| 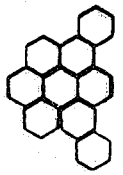 | 1,2-5,6-Dibenzocoronene | 90% or better | 21 | Green |
|  | 1,2-3,4-5,6-Tribenzocoronene | 90% or better | 6.5 | Golden Tan |
| 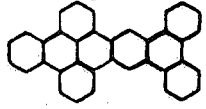 | 1,2-3,4-6,7-12,13-Tetrabenzopentacene | 90% or better | 21 | Green |
| 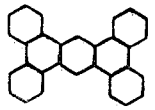 | 1,2-3,4-5,6-7,8-Tetrabenzanthracene | 0 | 10.8 | Pink |

TABLE IV (Cont.)

Preferred Compounds for Dark-Trace CRT

| Compound | | Degree of Deuteration | Color |
|---|---|---|---|
| 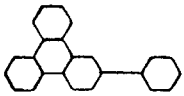 | 2-Phenyltriphenylene | 70% or better | Yellow |
| 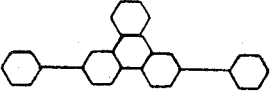 | 2-7-Diphenyltriphenylene | 70% or better | Pink |
| 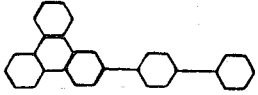 | 2-Xenyltriphenylene | 70% or better | Pink |
| 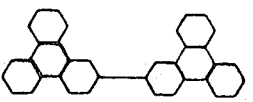 | 2-2'-Bistriphenylyl | 70% or better | Pink |
| 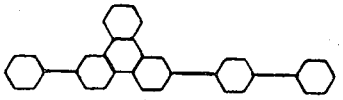 | 2-Xenyl-7-phenyltriphenylene | 70% or better | Green |
| 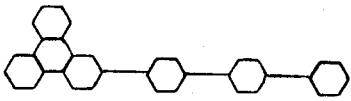 | 2-Paraterphenylyltriphenylene | 70% or better | Green |
| 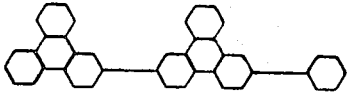 | 7-Phenyl-2-2'-Bistriphenylyl | 70% or better | Green |
| 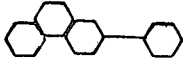 | 2-Phenylphenanthrene | 90% or better | Yellow |
| 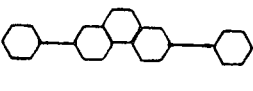 | 2-7-Diphenylphenanthrene | 90% or better | Pink |
| 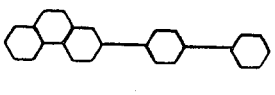 | 2-Xenylphenanthrene | 90% or better | Pink |
| 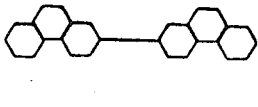 | 2-2'-Bisphenanthryl | 90% or better | Pink |
| 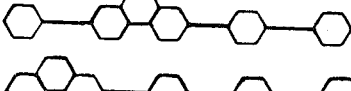 | 2-Xenyl-7-phenylphenanthrene | 90% or better | Green |
| 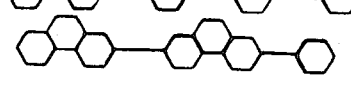 | 2-Paraterphenylylphenanthrene | 90% or better | Green |
| 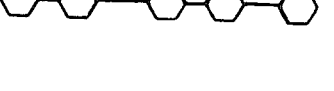 | 7'-Phenyl-2-2'-Bisphenanthryl | 90% or better | Green |

TABLE IV (Cont.)

Preferred Compounds for Dark-Trace CRT

| Compound | Degree of Deuteration | PC Color |
|---|---|---|
| 4-(4-paraterphenylylmethyl)benzophenone | p-terphenylyl, 70% or better | Yellow |
| 4-(4-paraquaterphenylylmethyl)benzophenone | p-quaterphenylyl, 70% or better | Pink |
| 4-(4-paraquinquephenylylmethyl)benzophenone | p-quinquephenylyl, 70% or better | Green |

The photochromic material (PC) is uniformly dispersed throughout a plastic matrix. Among others, the following methods can be used.

a. Dissolve the PC in pure monomer and polymerize the monomer in the absence of oxygen and in such a manner as to achieve practically complete cure leaving essentially no residual monomer.

b. Use method (a) but add 1 to 5 percent of a cross-linking agent such as ethylene glycol dimethyacrylate before commencing the polymerization.

c. Starting with preformed polymer, dissolve the polymer in a good solvent, precipitate the polymer with a poor solvent in order to remove soluble catalyst fragments, excess monomer, and other soluble impurities; dry the polymer in a vacuum oven, then dissolve a weighed amount of polymer and the proper amount of PC which is to be associated with the polymer in a common solvent. Freeze the solution quickly in dry ice and evaporate the solvent by the freeze-drying technique. Mold the resulting powder so as to produce the desired shape taking suitable precautions to exclude oxygen, to obtain optimum photochromic performance.

d. Dissolve preformed polymer along with the correct amount of PC in a solvent, and then cast thin or thick films on a suitable surface and remove the last traces of solvent by vacuum and mild heating (50°–70° C.).

e. By hot or cold milling (preferably cold) mix the correct amount of PC intimately with preformed polymeric material (preferably purified according to the method described in (c)). Mold the resulting powder so as to produce the shape desired taking precautions to exclude oxygen during molding in order to obtain optimum photochromic performance.

f. Employ the method described in (e) but instead of the PC material itself, use crushed polymer made according to (a) containing a high concentration of PC.

In all cases, e–f, it is assumed that optical transparency and lack of color of the polymer are both considered to be highly desirable. This being the case, the polymeric materials which exist today and which are useful in this application include:

TABLE V

| Thermoplastic | Thermosetting |
|---|---|
| Polyacrylates | |
| Polymethacrylates | Unfilled Phenol-Formaldehyde |
| Cellulose Acetate Polymers | Unfilled Melamine-Formaldehyde |
| Cellulose Propionate Polymers | Polyester-Styrene Combinations |
| Cellulose Acetate Butyrate Polymers | Polyurethanes |
| | Epoxies |
| Ethyl Cellulose | Allyl Carbonates |
| Polycarbonates | |
| Polyacrylonitrile (High Pressure Variety) | Glass |
| Polyamides | |
| Polystyrene | |
| Polymethylstyrenes | |
| Polychloromethylstyrenes | |
| Polystyrene-Butadiene | |
| Polyvinylacetate | |
| Unfilled Polyvinyl Acetals | |
| Polyvinyl Chloride | |
| Polyvinylbutryal | |
| Polyvinylformal | |
| Chlorinated Polyethers | |
| Silicones | | and copolymers and mixtures thereof.

Choice of U.V. Phosphor.

In general, phosphors which emit radiation peaking at wave lengths below 340 nm should be avoided in order to prolong the useful service lifetime of the photochromic materials and the resin. For best results, the emission should peak in the region 350–365 nm with a width of ≈40 nm at half intensity. Preferably the efficiency of conversion of electron beam power to U.V. should be greater than 10 percent and preferably the phosphor should be able to accumulate more than 1 coulomb/cm$^2$ before the U.V. output is reduced to 50 percent of the initial value. Phosphors which are known to emit in this spectral region for example are: $Ca_3(PO_4)_2:Ce^{3+}$, $NaBaPO_4:Ce^{3+}$, $KCaPO_4:Ce^{3+}$, $YPO_4:Ce^{3+}$, $(Ba_{1.55}Sr_{0.45})MgSi_2O_7:Pb^{2+}$ (Akermanite structure), $SrAlF_5:Eu^{2+}$, and $\alpha BaAlF_5:Eu^{2+}$. These phosphors could be used to provide working models. Phosphors not yet described in the literature and capable of providing the characteristics listed Are$Y_2O_2S:Ce^{3+}$ and $La_2O_2S:Ce^{3+}$ which, by analogy with $Eu^{3+}$, $Er^{3+}$, and $Tb^{3+}$ in these matrices should have high efficiency of cathodoluminescence (>10%) and be able to accumulate >1 coulomb/cm$^2$ before emission decreases to one-half the initial value.

Referring further to the figures, FIG. 2 shows a projection system having a CRT A of the type shown in FIG. 1 and described above.

Alternatively, the CRT could be made such that the U.V. phosphor only is inside the tube, the tube face is fiber-optic, coated with a dichroic material. Onto this is coated the PC layer, overlain with a material which is colorless, transparent and impermeable to molecular oxygen. In this construction, it is necessary to seal the edge of the PC layer with an oxygen impermeable layer such as polyvinyl alcohol or cellophane, or a metal or glass ring cemented in place.

As indicated previously, such a CRT may be made any size. In a projection system, it could have a front face of the order of 1 to 2 inches, since the image will be enlarged when projected. Projection of an image from the face of CRT A is accomplished by means of the projection system B, which includes a white light source 40 which projects through a filter 42, to remove U.V. and infrared light which affects the activity of the T'—T photochromic materials. The filter light beam is reflected onto the face of the CRT by a mirror 44, to illuminate the dark trace on the CRT, which is then further reflected by a second mirror 46, focused by a lens 48 onto a projection screen 50. The distance between lens 48 and screen 50 is greater than from lens 48 to the CRT face to obtain enlargement.

Figure 3:
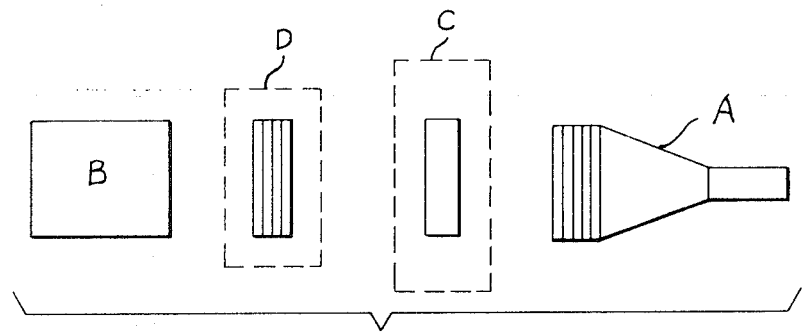
FIG. 3 is a systematic representation of a projection display system where the dark trace display screen is external to and separated from an activating cathode ray tube.
Figure 3A:
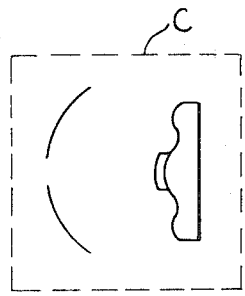
FIGS. 3A and 3B are focusing systems which may be used in the system shown in FIG. 3.
Figure 3B:
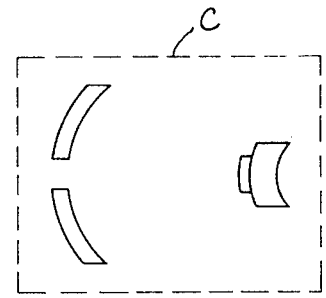

In FIG. 3 a variation of the system shown in FIG. 2 is shown. Here, CRT A has only the U.V. phosphor layer, and the T'—T photochromic material is carried by an external screen D. The phosphor image from CRT A is focused by a catadioptric lens system C, i.e., a focusing system, which may be an optical lens, a Schmidt reflector system as in FIG. 3A, or a Maksutov system as shown in FIG. 3B, all of which are well known in the art. The focused phosphor beam excites the screen D, and this dark trace image is either viewed directly or projected by a projection system B as described for FIG. 2.

Figure 4:
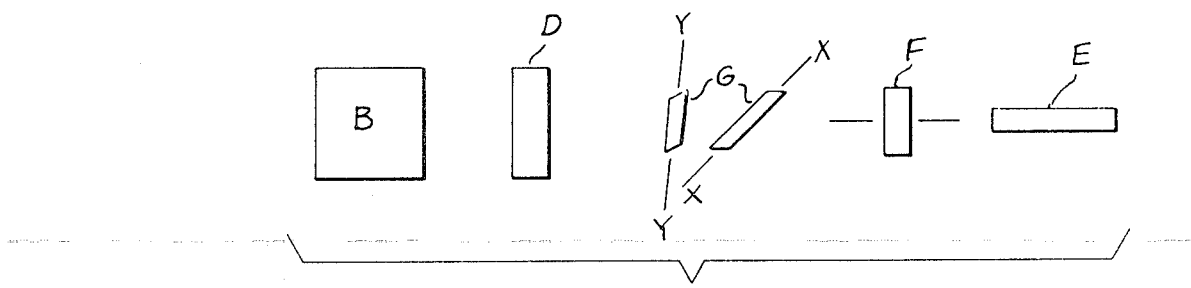
FIG. 4 is a systematic representation of a projection display using a separate dark trace screen as in FIG. 3, activated by an ultra-violet laser beam system.

Another type of system is shown in FIG. 4 which uses a T'—T photochromic screen as described in FIG. 3. In this system, the U.V. excitation is provided by a U.V. laser E. The U.V. light beam is given a scan by mirrors G which may be given X-Y scaning by conventional electronic means. In addition, a Pockels' cell F varies the intensity of the U.V. laser beam to darken the screen D in accordance with electronic circuitry and applied intelligence. The dark trace on screen D may be viewed directly or projected by B as previously described.

Figure 5:
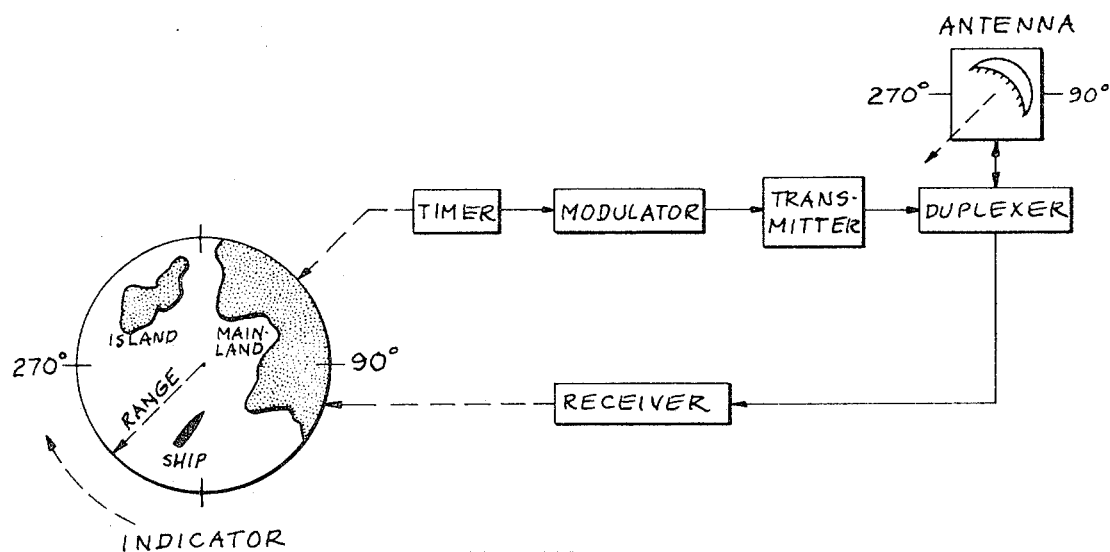
FIGS. 5 and 6 are diagramatic representations of radar systems using the display device of the invention. edge film FIGS. 7 to 19 demonstrate performance characteristics of the triplet-triplet photochromic display devices of the invention.

FIG. 5 illustrates one use of the dark trace display device of the invention as a radar indicator. FIG. 5 shows a block diagram of a pulse type radar system, with a PPI (plan position indicator) indicator shown diagramatically. The antenna is also shown diagramatically. The functioning of pulse type radar is well known and is described in "Radar," Alan Andrews, HOward W. Sams & Co., Inc., the Bobbs-Merrill Company, Inc. As shown, the PPI indicator shows a plan of the area surrounding the antenna with the position of the antenna at the center of the display. Other types of radar display could be used such as type A as shown in FIG. 6.

The output transducer of most radar systems is a cathode-ray tube (CRT) upon which is displayed the information being measured. Various methods of display are used, and each is referred to as a type of presentation. The CRT is the measuring device, converting time into distance even though the time elements are in millionths of a second. Since radar is primarily a range-measuring device, range is included in most presentations. The actual indicator is the CRT, but the indicator unit includes much more, such as facilities for accepting timing pulses, various types of sweep and pulse generators, mixer circuits, and various special-purpose circuits. Echo pulses from the receiver are applied to the CRT by one of two modulation methods-deflection or intensity. In the former, the trace is deflected from its normal path by an echo. In the latter, the trace is made brighter each time an echo pulse is applied.

Three primary characteristics are given in the various radar presentations-range (distance), azimuth (bearing), and elevation. Some systems may include more than one type of presentation, or may incorporate special circuitry to give other data regarding the target. We will list only those presentations which are more or less standard; space does not permit covering every possibility.

Figure 6:
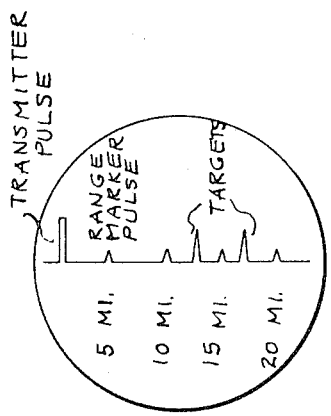
Figure 7:
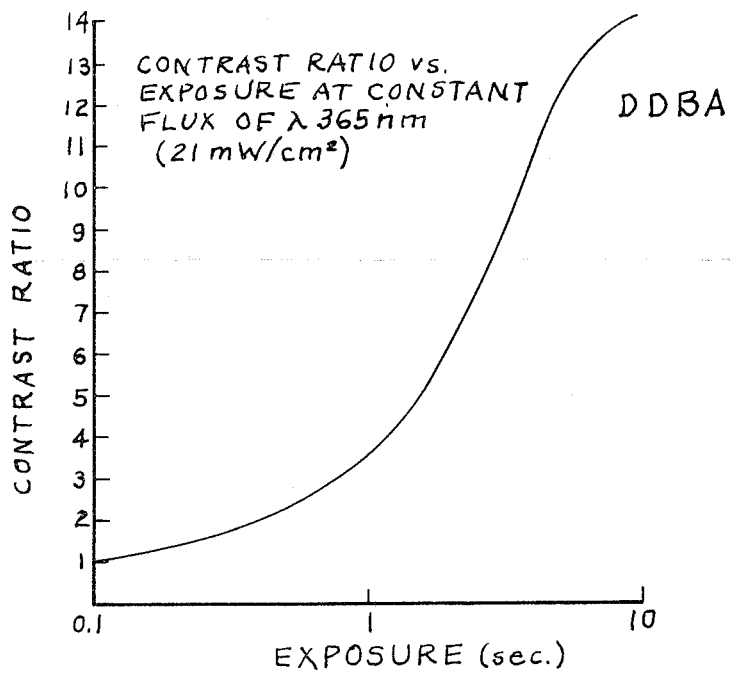
Figure 8:
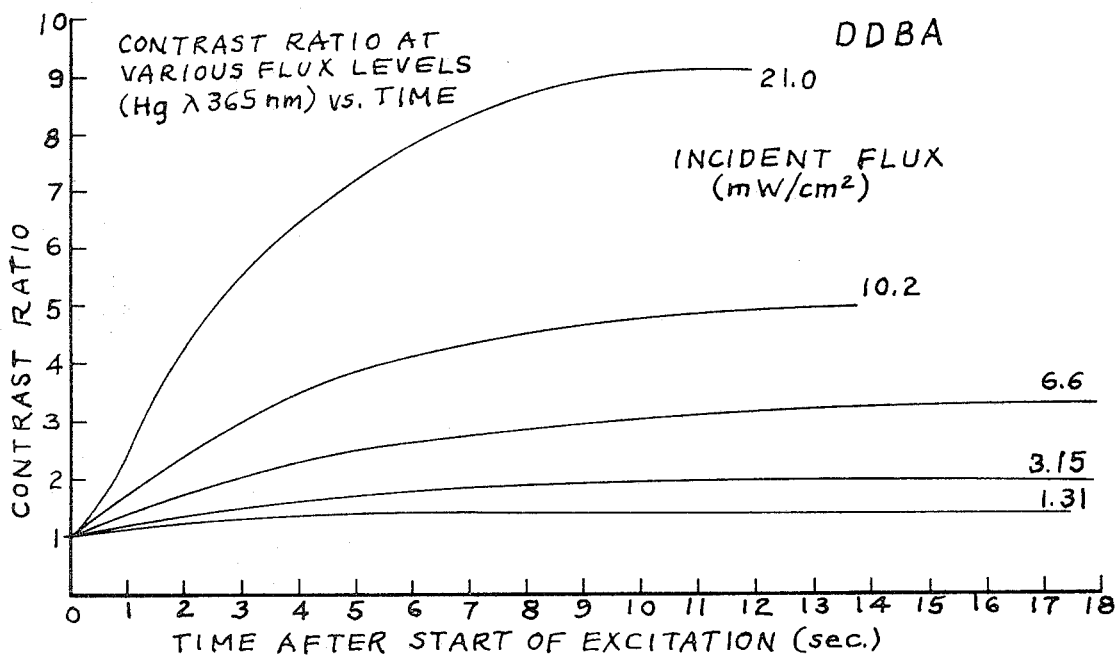
Figure 9:
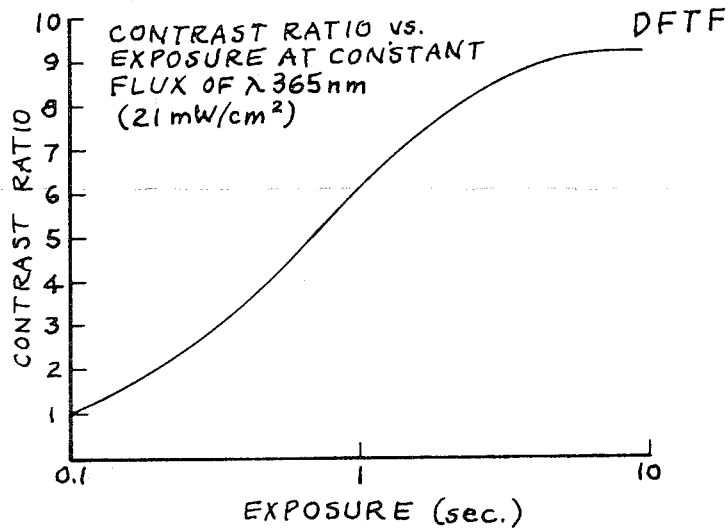
Figure 10:
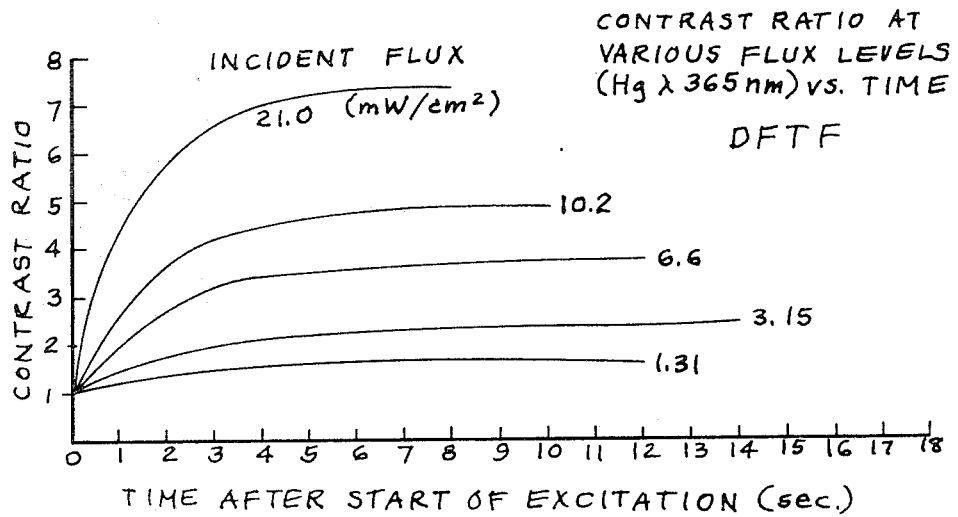
Figure 11:
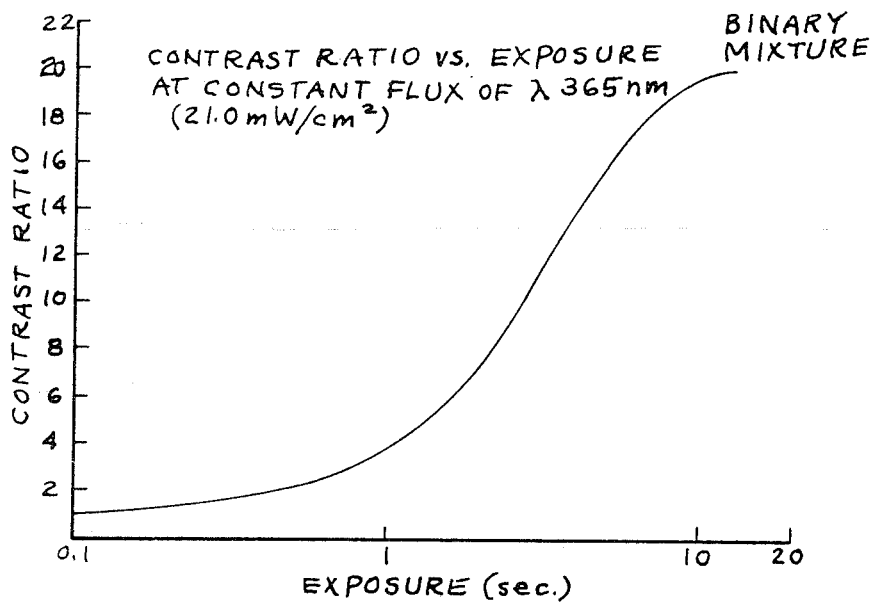
Figure 12:
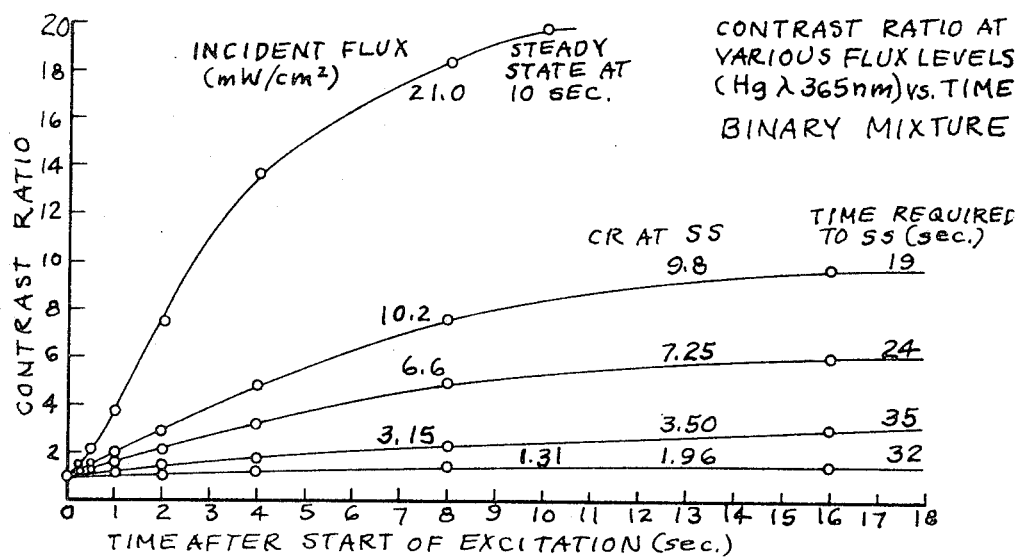
Figure 13:
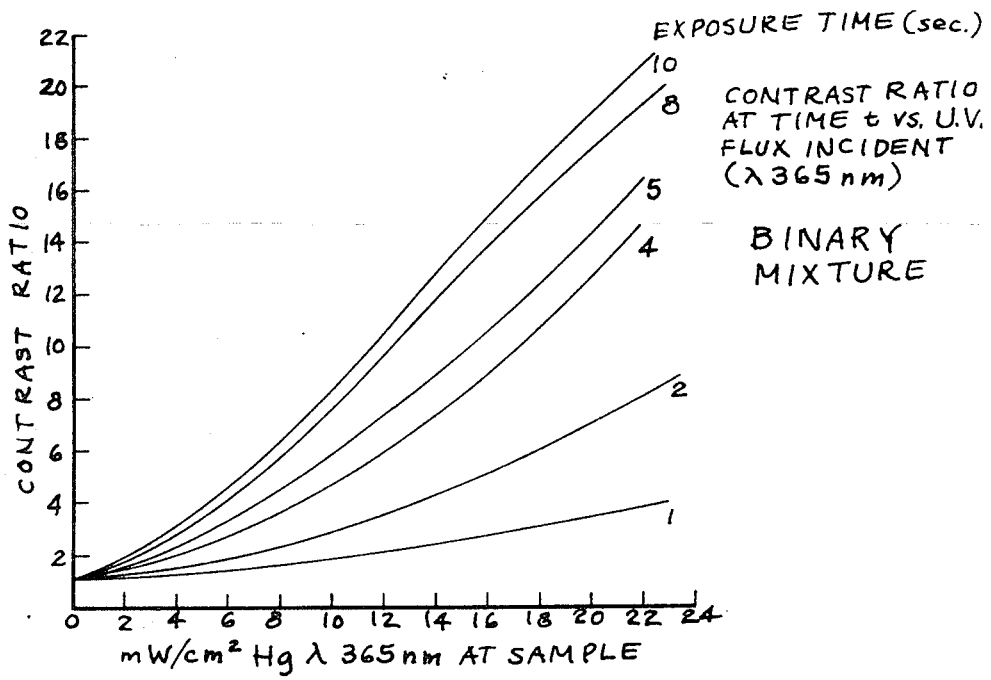
Figure 14:
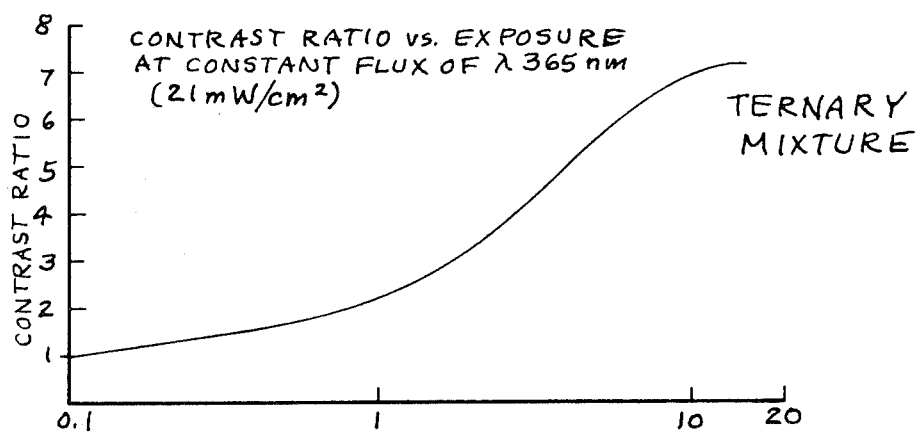
Figure 15:
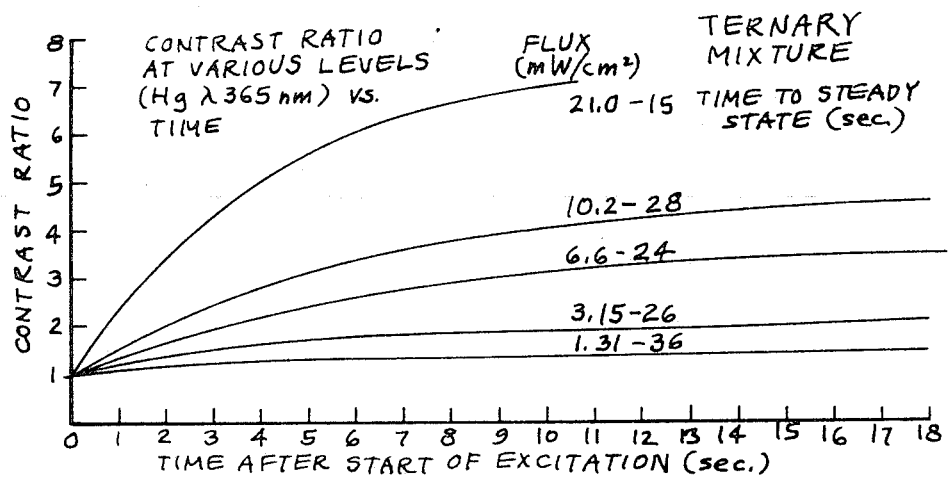
Figure 16:
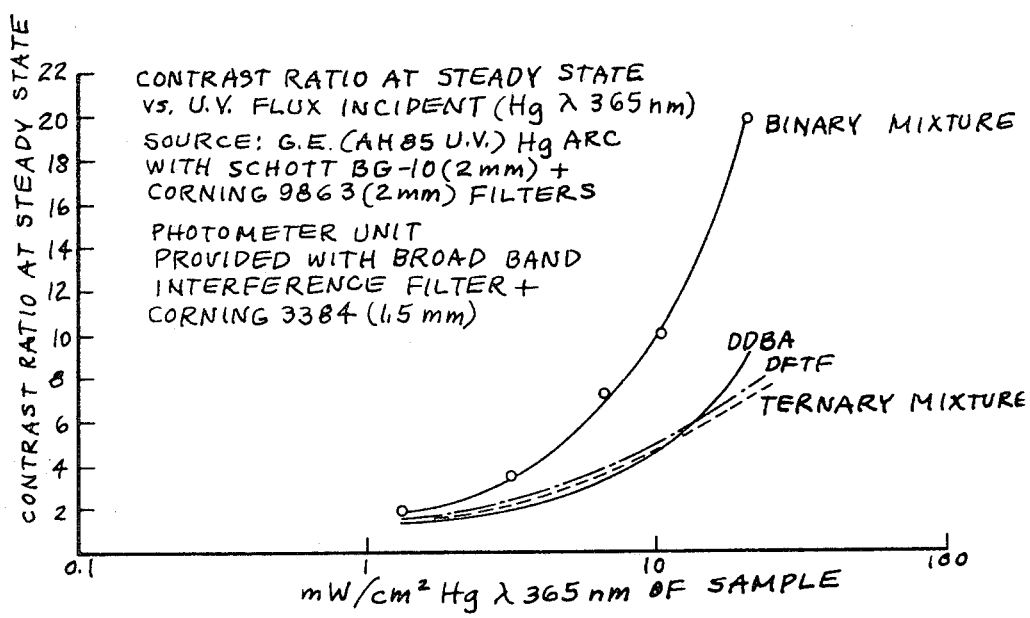
Figure 17:
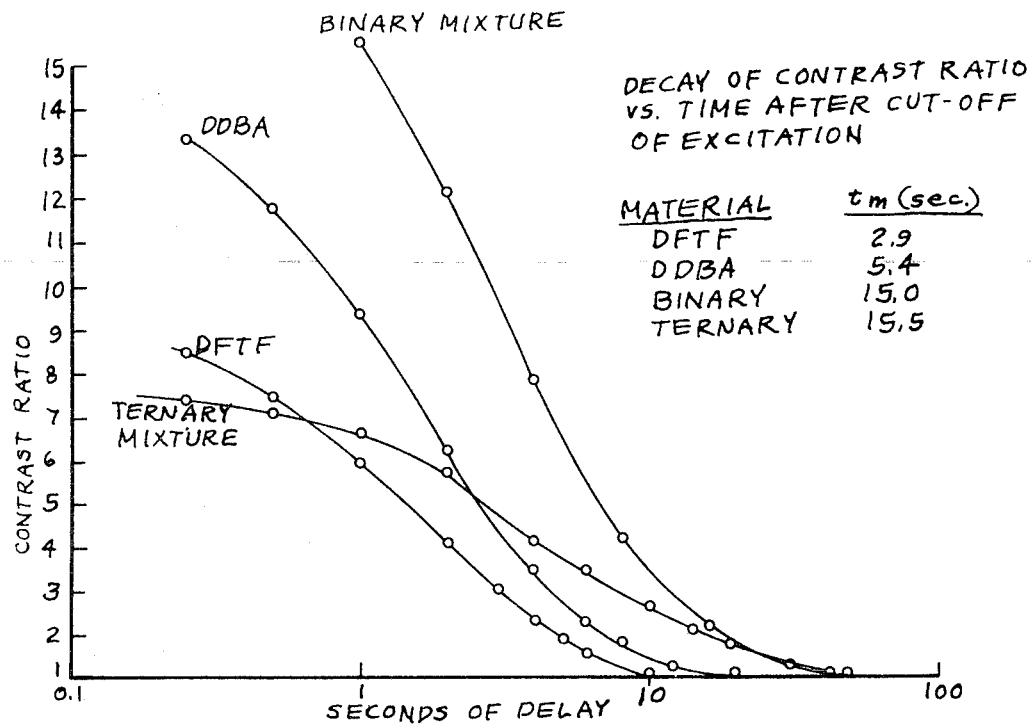

Type-A scanning, illustrated in FIG. 6 is probably the most popular of the deflection-modulation presentations. The electron beam is scanned horizontally across the CRT at a constant rate. At the right side of the screen the beam is blanked out and quickly reverts to the left side of the screen. (The action is similar to horizontal sweep in an oscilloscope.) Beam intensity is constant during the entire forward trace. Horizontal deflection is produced by a sawtooth waveform applied to the deflection plates or coils and synchronized with the transmitter pulsing. Echo pulses from the receiver are applied to the vertical-deflection section. Each time an echo pulse arrives, it causes a vertical deflection, called a pip, on the scope trace. The point on the trace where it is deflected depends on the target distance, and the height of the pip is determined by the strength of the echo signal.

The primary function of the A scope is to measure range. Direction (azimuth or bearing) is determined by the direction the antenna is pointing at the time the pips are observed. Rotating the antenna for maximum pip amplitude helps in more accurate determination of direction. Noise or interference signals, referred to as "grass," are also displayed as closely-spaced target pips. The sensitivity is usually adjusted so that the grass will have a very small amplitude. Echoes may also result from fixed objects capable of reflecting the signals. These are called ground clutter or, if on water, sea return.

Type-B scan, now shown, uses intensity modulation and indicates range and bearing simultaneously. A directional antenna covers a 180° section of the horizon. As the antenna moves from −90° to +90°, the CRT beam is deflected from left to right and is in synchronization at all times. At the right side of the screen the beam is blanked out and travels back to the left side of the screen, while the antenna completes the remaining 180° of rotation.

During horizontal scan, higher-frequency vertical deflection is also applied. As a result the beam traces a large number of vertical lines on the scope. Vertical scannning is from bottom to top, each upward trace initiated by a transmitted pulse. The beam is maintained at low intensity so that the vertical lines will just be faintly visible. Echo pulses intensity-modulate the CRT by applying a positive pulse to the control grid or a negative one to the cathode. In this type of presentation, an intensified line across the bottom corresponds to the time of the transmitted pulse. Range is read vertically, and azimuth is read along the horizontal axis.

Both horizontal and vertical scanning are used for Type C, just as for Type B. But in Type C, vertical deflection is proportional to elevation and horizontal deflection is proportional to azimuth. No range information is shown. The antenna scans both horizontally and vertically, making it necessary to synchronize the movements of the CRT beam and the antenna. Intensity modulation is used, the targets appearing as more intense areas on the indicator screen.

Range and elevation are indicated by Type E scanning. The CRT beam is deflected so that each range trace makes an angle across the indicator proportional to the corresponding elevation. This prevents faraway targets from appearing to be at lower altitudes than nearby targets at the same elevation. For example, suppose two planes are the same height but at different distances from the radar antenna. The antenna must be lower to receive the echo from the plane farther away. With tilted scanning, each of the bright spots is the same distance from the horizontal base line, indicating the same elevation. Range is measured from the left, along the horizontal base line of the trace.

The Type-J scan is a variation of Type A, in which the beam moves around in a circle near the edge of the screen. Its main advantage is that a longer trace is presented compared with that of Type A, making possible more accurate range measurements. The pip indicating the transmitted pulse is usually located at the top of the screen as shown. Target pips deflect the beam out of its circular orbit for the duration of the pip.

Type-P scanning as shown in FIG. 5 shows range and azimuth for a full 360°. The center of the CRT screen represents the location of the radar antenna. The scanning lines begin at the center and work toward the edge of the screen. Circular scanning is mush slower than line scanning, and each successive outward scan is displaced slightly from the preceding line. A transmitted pulse occurs each time a new outward sweep begins. As the beam reaches the outer edge it is blanked out and then quickly returns to the center to being another trace. The result is many radial scanning lines around the complete circle.

Intensity modulation is used; each time a signal pulse returns, the scope is brightened at that point, giving a complete map of the surrounding area. By using a CRT with a long-persistence screen, the entire map is always visible whenever the radar is in operation. Land masses, ships, planes, or anything capable of reflecting signals are indicated on the maplike presentation. Objects toward the outer edge of the screen are farther away than those closer to the center. Usually the control-grid bias is adjusted just beyond cutoff so that the radial lines will not be visible, and only the targets can reduce the bias sufficiently to brighten the screen. This type of presentation is also called PPI, or plan position indicator.

Antennas for PPI work must be highly directional in the horizontal plane. They rotate through a full 360° and must by synchronized with the circular deflection of the indicator. For ship PPI's a heading flash is sometimes used. It is a radial scan, more intense than the others, and indicates the direction the ship is heading. It may be produced by causing the antenna to close a switch each time it passes the forward direction. This switch connects to the intensity-modulation system so that each time the switch is closed the CRT bias is decreased, causing a more intense scan.

The dark trace radar of the invention is particularly useful in aircraft cockpits where the ambient light varies from bright sunlight to darkness.

While the dark trace device has been described as useful in radar systems, it will be obvious that it is useful for displaying any real time information changing slowly with time.

Moreover, the device could be used for a message type image due to the persistance of the image of up to 20 seconds or more. Such applications include stock quotation reading where a quote is called for by dial phone and shows on a display tube. This message does not need long persistence since it is quickly read and could be allowed to fade. If longer persistence is needed, a refresh mode is coupled with the CRT circuitry. Such circuitry is well known in the electronic art.

It will be obvious that other types of radar systems could be used other than pulse, such as FM (frequency modulation) and frequency-shift (also known as PD-pulse Doppler as described in "Radar" by Alan Andrews).

The following specific examples are given to enable persons skilled in the art to better understand and practice the invention and are not intended to be limitative.

EXAMPLE 1

A sealed CR tube (5ZP16) containing a U.V. emitting phosphor (p–16, $\lambda$ max = 3900A) was run at 7kV, with a 1 ma cathode current using a raster size of 0.5 cm $\times$ 2.0 cm. A T'—T photochromic sample consisting of epoxy resin 0.04 cm thick sandwiched between two slips of colorless glass each 1 mm thick was placed in contact with the outer surface of the window of the CR tube; a small hollow square ( □ ) of black paper was attached to the outer surface of the window. The active ingredient in the sample was deuterated benzocoronene. The mean lifetime of deuterated benzocoronene triplets in this matrix is about 16 seconds so the sample was irradiated for about 48 seconds after which time it was removed quickly and placed face down on a white card. The room light transmitted by the sample was diffusely reflected by the white card and passed through the sample again thereby doubling the optical density. The area hidden by the opaque hollow square mask was the same color (pale yellow) as the non-activated sample, whereas the area hit by U.V. light from the P–16 phosphor was a pale blue gray color easily distinguishable under these conditions. Next, the room lights were turned off, the sample was excited again as before after which it was quickly put in a black box with top open and the box then placed under the bench. The area hidden by the opaque hollow square mask did not glow whereas the area irradiated by U.V. light from the phosphor emitted yellow phosphorescence which was visible for several minutes thereby demonstrating the presence of triplet molecules in the sample.

By means of pottasium ferri oxalate actinometry, the rate of emission of light from the phosphor was found to be 2.804 $\times$ 10$^{15}$ quanta/cm$_2$.sec = 1.428 milli Joules/cm$^2$ sec = 1.428 milli Watts/cm$^2$ at the sample.

EXAMPLE 2

A fused quartz plate 2" $\times$ 2" $\times$ 1 mm was coated on one side with a thin layer of U.V. phosphor. After this was dry, a thin layer of organic plastic film forming material was coated on the phosphor to provide a flat outer surface on which was evaporated a layer of aluminum metal. This was then heated to decompose the organic film after which an electrode and wire lead were affixed to one corner of the Al metal.

On the uncoated face of the quartz plate, three different samples of T'–T PC samples were affixed, using a thin layer of silicone grease which was known to have good transmission in the $\lambda$region ($\approx$3,000A) in a thin layer. The quartz plate was then taped at all four corners to the inside of the glass face plate of a demountable CR tube with the Al layer facing the electron gun and the T'—T PC samples facing out to the face plate.

The T'—T PC samples were:

1. 2-, 7-diphenyltriphenylene (C$_{20}$H$_{20}$), 1 $\times$ 10$^{-2}$ M/Kg of epoxy resin. The T'—T PC resin layer was 0.0813 cm. thick, between two fused quartz plates; total thickness of sample was 0.1154 inches.

2. Deuterated 1,2-5,6-dibenzanthracene, 1 $\times$ 10$^{-2}$ M/Kg of epoxy resin. Resin layer 0.04 cm. thick between two thin glass plates; total thickness about 2.4 mm.

3. Ternary mixture of 1,2-benzocoronene; 1,2-5,6-dibenzocoronene; and 1,12-2,3-10,11-tribenzoperylene. Resin layer was 0.045 cm thick between two thin glass plates, each T'—T PC was about 1 $\times$ 10$^{-3}$ M/Kg of resin.

The results from sample (1) were the best because of the quartz plate and the high $\epsilon_u$ value for the active ingredient. The samples mounted between the glass plates could not perform at the optimum because the emission from the U.V. phosphor has its peak intensity at 2,965A and one glass plate absorbs 98.3 percent at 2,950A and 49 percent at 3,200. .

Sample (1): The area of scan was 10 mm $\times$ 12 mm at 18 kv/18 $\mu$ amp. Sample (1) turned deep pink color. The total contrast ratio is Ft. Lambers e$^-$ beam off/Ft. Lamberts e$^-$ beam on = 510/330 $\cong$ 1.5

Estimated OD (optical density) at $\lambda$max. for T'-Tabs. $\approx$0.6 to 0.8 for two passes. Time to achieve maximum intensity of color about 2.5 seconds, time to lose about 80 of color was about 3.5 to 4 seconds. Color of T 27S emission was green.

Sample (2): using a long, narrow trace about 25 mm $\times$ 2.5 mm yielded a deep pink color comparable to the performance of Sample (1); Sample (2) was irradiated at higher current density 7 The estimated OD in YG region was about 0.6 to 0.8 for two passes through the sample. The time to achieve maximum color was 2 to 3 seconds, while about 5 seconds were required to lose approximately 80 percent of the color. T → S emission was yellow orange.

Sample (3): With the same narrow trace as for Sample (2), Sample (3) turned blue gray as viewed with white light illumination from the front. With two passes through the sample, the OD was estimated to be $\geq$ 0.4. Because two of the components in Sample (3) are deuterated, the lifetime was about 21 seconds and the color and T → S emission have longer persistence. The color of the T → S emission is yellow orange. A CRT face plate was prepared with the Samples (1), (2) and (3) as previously described and additional Samples (4) and (5).

Sample (4); 1,2,5,6-dibenzanthracene, 1 × 10$^{-2}$ M/Kg resin; resin layer 0.0445 thick, mounted between quartz plates as Sample (1).

Sample (5): 2,2'-bisphenanthryl, 1.2 × 10$^{-2}$ M/Kg resin, resin layer 0.039 cm thick, between thin glass plates.

The voltage was set at 15 kv, the electron beam current at 10 $\mu$a. Samples (1), (2), (4) and (5) had a contrast ratio of about 1.39. Sample (3) was as given above. Samples (1), (2), (4) and (5) turn pinkl; Sample (3) turned blue gray.

The U.V. phosphor used in this example was X–80 phosphor from General Electric Company, which is a barium-zinc silicate activated with lead.

EXAMPLE 3

In 10 cc's of reagent-grade, thiophene-freebenzene are dissolved 0.83 mg of 2-,7-, diphenyltriphenylene, 7.12 grams of a partially-cured polymeric phenylsiloxane, (Owens-Illinois Glass Resin No. 908) and 0.71 gram of a cross-linking catalyst (Union Carbide No. A-187). The colorless, clear solution is placed in a small, glass crystallizing dish (3 inches in diameter) whose inner surfaces have been sprayed previously with a suitable high-temperature teflon release agent followed by a light spray with a silicone mold release agent and is then heated to 110° C. in vacuum before filling with the solution after the treated dish is cooled. The benzene is removed slowly by heating to ≈50° C. in air over a period of ≈16 hours. Next, the vessel is placed in a vacuum oven on a thick plate of brass with the vertical wall of the vessel encircled by a sleeve of brass in order to keep the vessel and its contents at constant temperature which is read by means of brass-jacketed mercury thermometer through the window in the oven door. Preliminary experiments without using any PC agent had established the degree of heating and evacuation required to give a cross-lnked, hard, bubble-free casting. Because of poor heat transfer in the vacuum oven, it was found that evacuation of air followed by partial pressurization with O$_2$-free nitrogen followed by an increase in rate of heat input was necessary to give a workable procedure. Too low a pressure caused bubbling of the resin at the higher temperatures, and the resin in these thin domes would then cross-link and could not relax. Thus, by the precedures described, the temperature is increased step-wise up to ≈135° C. over a period of 8 hours after which th4 cure is carried out for 40 hours at this temperature to yield samples free from bubbles. The temperature is then increased to ≈150° C., held there for 20 to 30 minutes after which the heaters are turned off. After cooling to room temperature, the pressure is resotred to atmospheric by N$_2$ after which the sample is removed from the oven. (This "glass" resin has a linear coefficien of thermal expansion 10 times that of soft glass, and, as a liquid, wets glass. For these reasons, a separatrix is necessary otherwise the resin will crack when it cools if it is bonded to the vessel in which it is cast.).

The disc of resin is removed from the vessel by chilling in a dry-ice chamber for ≈10 minutes. Because of the high permeability of the resin to molecular oxygen, after sitting about 20 minutes in air, the sample is inactive, and triplet molecules cannot stay alive in the matrix because of the presence of ordinary triplet O$_2$ molecules in the resin. Both faces of the disc are now ground and polished to a thickness of ≈1mm using appropriate abrasives and laps. Without the cross-linking agent, the resin would be too brittle to withstand these manipulations; thus, the cross-linking catalyst reduces the time required for curing the resin and also markedly increases its toughness. The sample so made has a concentration level of 4 × 10$^{-4}$ M/L of diphenyltriphenylene in the glass resin. The completion of this portion of the procedure is designated as "STEP I" for future reference.

At this stage the operability of the sample was tested and found to be nil. It is then placed into an evacuable chamber provided with a fused-quartz window and the pressure reduced to 1 × 10$^{-6}$ torr. At this pressure, the concentration of triplet molecules capable of being generated by a certain constant exposure level of U.V. (≈20 mW/cm$^2$, $\lambda\lambda$300–400 nm) increased slowly by pumping and did not appear to increase after ≈16 hours. (The triplet molecules in this sample make themselves manifest be creating a pink color by transmitted light or by emitting green phosphorescence in the dark.) After admitting air to the chamber, the sample becomes inoperable after ≈20 minutes. Next, a 250 watt heat lamp with a glass envelope is placed over the window while the sample, lying on top of a thermocouple, is evacuated at 1 × 10$^{-6}$ torr. The near infrared radiation lying in the region 0.75 - 1.5 $\mu$ is absorbed by the C-H oscillators in the benzene rings of the polymer thereby warming the polymer and enchancing the rate of de-gasification so that at a sample temperature somewhat in excess of 150° C., the molecular oxygen is removed after pumping only 1 hours. In addition. during this experiment, it was found that the rigidity of this matrix is such that triplet molecules can stay alive in it at temperatures as high as 100° C. This is possible because of the extensive cross-linking and the high (>300°C.) second-order glass transition temperature.

EXAMPLE 3a

After completing STEP I of Example 3, the PC RESIN disc is taped to one side of a quartz disc 3 inches in diameter by 1 mm thick; the other face of the quartz disc is provided with a layer (4 mg/cm$^2$) of U.V. emitting phosphor and an evaporated Al mirror provided with a fine copper wire soldered to the edge of the mirror. The quartz disc is taped to the inner surface of a glass disc 4½ in diameter × ⅜ thick which is the removable window of a demountale cathode ray tube (CRT).

The window is put in place, vacuum obtained in the cavity of the CRT which now contains the PC resin sample and the phosphor, and a heat lamp outside the window is used to shorten the time required for degassing the PC resin disc. After reaching a pressure of 2 × 10$^{-7}$ torr which required pumping overnight, it was possible to test the applicability of the PC resin as the principal component of a dark-trace CRT by employing the apparatus schematically depicted in FIG. 1. Using an accelerating voltage of 20 kV, electrons emitted from the hot W cathode are accelerated in the forward direction and impinge on the rear surface of the phosphor. The area subjected to electron bombardment is controlled by the dimensions of the raster scan employing conventional controls. The electron beam current collected is measured by a Meter. The phosphor employed consists of a Ba-Zn Silicate activated by Pb (General Electric Co. No. x–80) whose peak emission lies at $\approx 300$ mm and whose measured efficiency of cathodluminescence is $\approx 10$ percent; thus, for example, at 20 kV and 10 $\mu$amp/cm$^2$, the input power indicate by the meters is 200 mW/cm$^2$ and the UV output referred to the surface of phosphor facing the PC resin is $\approx 20$mW/cm$^2$. The action of the electron beam on the phosphor liberates UV quanta which in turn, activate the PC resin which becomes colored owing to the presence of the triplet molecules generated by the UV. The degree of darkening is normally given in terms of contrast ratio (C.R.) which, for our purposes, will be defined by:

C.R. = (Luminance Inactive)/(Luminance Active)
These two quantities are measured by means of a 0.5° spot light meter with photopic response; the two white light sources furnish the Illuminance at the sample which is adjusted to be $\approx 50$ foot lamberts. The output of the meter is displayed on the chart of a pen recorder. The response of this sample in terms of (C.R.) versus ($\mu$ amp/cm$^2$) is shown in FIG. 19. The U.V. phosphor emits some violet and blue light; also, the PC sample emits violet and blue fluorescence while being excited and blue green and green phosphorescence both during and after excitation. The presence of this emission lowers the contrast ratio and for this reason, a broad-band yellow-green filter is placed in front of the spot meter to remove much of this unwanted emission thereby enhancing the contrast ratios.

In previous experiments involving the U.V. phosphor but no PC resin, measurements with a calibrated thermopile indicated that the U.V. output was linear with current density beyond 12 $\mu$a/cm$^2$. Thus, since it is obvious from FIG. 19 that saturation of the PC resin sample commences in the vicinity of 3 to 4 $\mu$ amp/cm$^2$, the problem is ascribable to the PC material, not to the phosphor. From prior experience, it is possible to judge that this saturation arises from the existence of a triplet-to-triplet (T'—T) absorption band in the vicinity of 300 nm. This means that for this particular molecule, as soon as triplets are generated, they absorb some of the exciting radiation coming from the phosphor thereby acting as an internal filter which inhibits the absorption of these photons by ground-state molecules, and this latter procedure is necessary to form additional triplets. To check this out, a quantum mechanical colculation was made according to the method described by Dr. M.K. Orloff in J. Chem. Phys, 47, 235–241 (1967), and the presence of a moderately strong T'—T absorption band in this region was predicted. Accordingly, since there were no strong zero-zero T'—T transitions calculated for this molecule to longer wave lengths (up to 400 nm) excitation by nearly monochromatic light from an 85 watt mercury arc was used so that data could be obtained more expeditiously, as described in Examples 4,a,b,c, and d.

EXAMPLE 3b

This example relates very closely to Example 3c a. The employed polished disc achieved by reaching STEP I in 3a is empllyed as a substrate onto which a layer (4 mg/cm$^2$) of the same U.V. emitting phosphor is settled. After draining off the excess liquid, a thin film of cellulose nitrate is settled on top of the phosphor; the phosphor and film are then air dried at room temperature and at 110° C. after which a tin ($\approx 0.2$ $\mu$) film of Al is evaporated onto the organic film. Ordinarily, at this stage, the organic film is burned off by heating in air for 30 minutes at 400° C. but in this instance, that step is eliminated, and a wire is soldered to a small area treated with Ag paint at the of the Al fiml and the PC resin disc containing the phosphor is taped to the inner surface of the window with three small, thin supports spaced at 120° between the PC resin surface and the inner surface of the window to expedite de-gassing of the resin which is accomplished by pumping overnight as before. Next, by using the electron beam at low voltage (5 kV), the organic film is destroyed and it is then possible to proceed with the measurements of contrast ratio.

By varying the current density, the dependence of contrast ratio on current density is obtained. The curve is found to possess the same shape as that shown in FIG. 19 with the exception that similar things now happen to the contrast ratio at about one-thiord the former current density. In other words, the saturation now sets in at 1 to 1.3 $\mu$a/cm$^2$ instead of 3 to 4 $\mu$a/cm$^2$. This shows that there is now better optical coupling between the U.V. phosphor and the PC resin because their surfaces are now in contact instead of being separated by 1mm of quartz. Consequently, a given contrast ration can be achieved at a lower current density but the upper limit of contrast ratio is still imposed because of the screening by the T'—T absorption band of this compound in the vicinity of 300 nm.

EXAMPLES 4-a, -b, -c, and -d

PC resin samples nominally 0.045 cm thick made up in Dow epoxy resin 332 employing the eutectic mixture of phthalic anhydride and hexahydrophthalic anhydride as hardener and sandwiched between thin (1mm) slips of soft glass (lantern slide cover glasses) are excited by employing known intensities of U.V. radiation (Hg $\lambda$365 nm) and the contrast ratios measured as functions of exposure and time. The samples are:

4a.

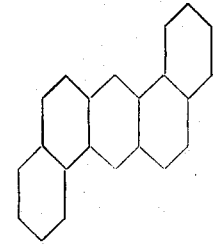

Per-deuterated dibenz (a,h) anthracene, 1×10$^{-2}$ M/L; (S7247-61-2)

4b.

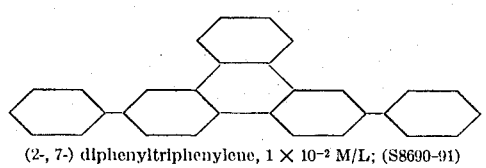

(2-, 7-) diphenyltriphenylene, 1 × 10$^{-2}$ M/L; (S8690-91)

4c.

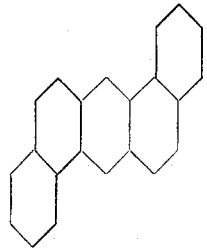

Per-deuterated dibenz (a,h) anthracene, 5 × 10⁻³ M/L plus

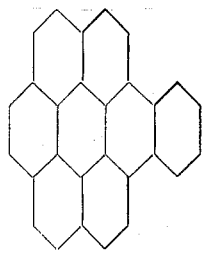

Per-deuterated 1,2- benzocoronene, 1 × 10⁻³ M/L; (S7076-195)

4d.

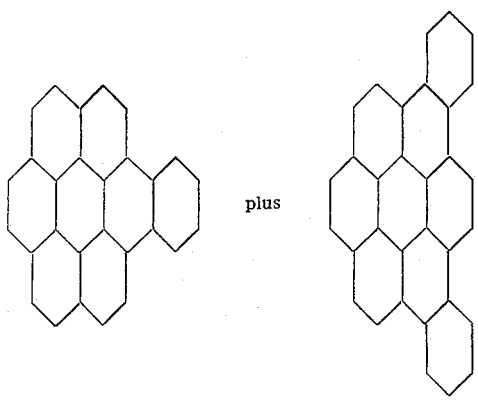

per-deuterated 1,2-benzocoronene; 1.35×10⁻³ M/L    plus    per-deuterated 1,2,-5,6-dibenzocoronene; 0.9 × 10⁻³ M/L plus

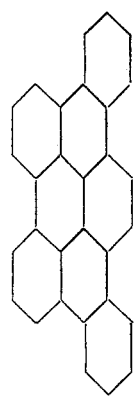

1,12-2,3-10,11-tribenzoperylene 0.9 × 10⁻³ M/L; (S7909-81)

The experimental arrangement is similar to that described in Example 3, the chief difference being that both the U.V. and white light sources are now in front of the sample; also, only one flood light is used. The shutter is activated manually by a calbe release. Before this is done, the level of illumination at the sample is adjusted to be ≈50 foot lamberts and a colorless heat filter (Schott KG3, 3 mm) is placed in front of the flood light so the sample will not be overheated. Then the zero level of the spot meter is made to agree with that of the recorder and the gain of the recorder adjusted so as to accommodate the maximum light signal. Then the shutter is opened and a tracing made of the decreasing signal versus time as the magnitude of the color increases. After reaching steady state, the shutter is closed and the decay of the color recorded. These same manipulation on buildup of color are then carried out at various known levels of flux incident on the sample; these varied from 1.3 to 21 mW/cm$^2$ of Hg λ365 nm. The data obtained, after processing, are shown in FIGS. 7 through 18, inclusive. These data show that 8 10 mW/cm$^2$ of U.V. (≈365 nm) at the sample will generate contrast ratios in the range of 5:1 to 10:1 with probable improvements possible after optimization. It is known that none of these samples absorb all the exciting radiation because the products of concentration and thickness are not sufficiently great. After doubling the sample thickness, the following factors of improvement in contrast ratio are obtained for :4a, 2.47X :4b, 1.23X :4c, 1.25X :4d, 1.35X Pertinent Results Obtained.

The results were obtained by steady-state and chopped (intermittent) excitation. They are plotted in terms of:

A. Contrast Ratio at Steady-State vs. mW/cm$^2$ of 3650A Illumination b. Contrast Ratio vs. Exposure to 3650A Illumination c. Contrast Ratio vs. Elapsed Time after Onset of Excitation d. Contrast Ratio at Different Times vs. mW/cm$^2$ of 3650A Illumination For intermittent excitation, there are too many parameters to present all types of plots which are possible. The reason for chopping is that the rate for the initoial absorbtion of the exciting radiation is extremely high but, once generated, the rate of decay of the transient molecules is slow. In addition, at the long-time tail of the decay, the rate of decay is slower than that at the onset of decay commencing with a high concentration of transients. Therefore, a darker color is achieved when using ten-fold illumination and intermittent exposure (10 percent ON 90% OFF) than would be obtained by employing steady-state excitation at unit illumination. This procedure would be employed in order to prolong the useful life of the U.V. phosphor in the CRT.

EXAMPLES 5-a, -b, -c, and -d

The same PC materials used in the epoxy samples employed for giving the results described in Examples 4-a, -b, -c, and -d are made up in Lexan polycarbonate resin (Grade 105, Color 111 NAT) by dissolution in a common solvent, freeze drying, and compression molding. The solvent used is s-tetrachloroethane, and the amount is 25 cc in all cases. Also, in each case, the quantity of powdered resin employeis 6.566 grams. The quanities weighed out allow for $\approx 20$ percent waste, and the molded discs formed are 3 inches in diameter $\times$ 1 mm thick with both faces being polished by the molding operation; the various samples are described as follows:

| Sample | PC Material[1] | mg/6.56 g resin | Concentration moles/liter |
|---|---|---|---|
| 5a | $C_{22}D_{14}$ | 16.00 | $1 \times 10 \ 116^2$ |
| 5b | $C_{30}H_{20}$ | 20.80 | $1 \times 10^{-2}$ |
| 5c | $C_{22}D_{14}$ | 8.00 | $5 \times 10^{-3}$ |
| 5d | $C_{28}D_{14}$ | 2.00 | $1 \times 10^{-3}$ |
| 5d | $C_{28}D_{14}$ | 2.69 | $135 \times 10^{-3}$ |
| 5d | $C_{32}D_{16}$ | 2.05 | $0.9 \times 10^{-3}$ |
| 5d | $C_{30}H_{16}$ | 1.85 | $0.9 \times 10^{-3}$ |

[1] For structural formulae refer to Example 4

Before freeze drying, the individual sample bottles, while stoppered, are twirled in liquid nitorgen so as to freeze the solution in a thin layer over the inner wall of the vessel. The mouths of the bottles are then quickly connected to tubes leading to the vacuum cavity of a large cold trap containing liquid nitrogen. The loss of heat by evaporation keeps the solvent frozen (M. pt. $-36°$ C.), and the residues remaining after sublimation of the solvent consist of dry, fluffy solid resin with the PC agents molecularly dispersed in the resin which is then compression molded to form the discs. Because of the high permeability of Lexan polycarbonate (the repeating unit is

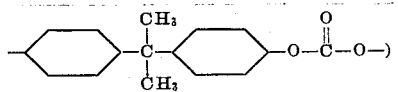

to molecular oxygen, the molded discs are not photochromic unless the oxygen is removed by pumping for $\approx 1$ hour at $\approx 1 \times 10^{-6}$ torr and $\approx 150°$ C. for $\approx 24$ hours at room temperature. It is then ascertained from the decay curves for the phosphorescence emission from the triplet molecules that the mean lifetimes of the various materials in this resin at room temperature are 95 to 100 percent of those values measured in the same resin at $78°$ K (temperature of liquid nitrogen). This contrasts with the epoxy resin where the mean lifetime values at room temperature are 75 to 80 percent of those at $78°$ K or for polymethylmethacrylate where they are 50 percent. As an initial approximateion, the concentration of triplet molecules attainable at steady state (when employing a given light source) is proportional to the mean lifetime of the triplets, thus, the optical densities achieved with these samples (Lexan polycarbonate matrix) are increased by factors of approximately 1⅓ over their counterparts in Example 4 (epoxy matrix) for an equivalent thickness of sample. These samples must be used in vacuum or in the absence of molecular oxygen unless the broad faces are protected by cemented-on cover glasses and the periphery painted or sprayed with polyvinylalcohol solution which dries to form a skin impermeable to molecular oxygen.

Tube Life.

From previous experience with these photochromic materals it is known that the weak component in such a combination is the phosphor and that one of the chief problems will be that of establishing the proper values for the variable parameters pertaining to the CRT in order to obtain a practical value of $\approx 1,000$ hours for the "half-life" of the tube.

The tube life depends on phosphor efficiency, beam current required to achieve depth of color desired, coulombs/cm$^2$ to half intensity, longevity of the photochromic resin, and pulse repetition rate required. For existing samples not optimized and capable of achieving better performance than those disclosed here, the present results show experimentally that 8 to 10 milli watts/cm$^2$ of U.V. ($\approx 365$ nm) at the sample will generate contrast ratios in the range 5:1 to 10:1 (with probable improvements after optimization). With a continuous raster, a current density of $3\mu a/cm^2$, and a voltage of 20 kV ($\approx 62$ mW/cm$^2$ of electron beam), $\approx 8$ mW/cm$^2$ of U.V. could be achieved at the sample assuming 13 percent conversion to U.V. which is about the maximum value achievable from the phosphors contemplated. Under these conditions of operation, the U.V. emission would be down to half intensity after 278 hours of operation assuming that the phosphor can tolerate 3 coulombs/cm$^2$.

As the experiments with chopped excitation indicate, it is possible to extend the useful phosphor life by increasing the electron beam current density as much as 10 fold but pulsing the beam so that the ratio of (beam off/beam on) = 10:1. Under these conditions the instantaneous U.V. output will be approximately 10 fold greater when the beam is on but since the mean lifetime of the phosphor emission is of the order of 0.05–$3\mu$sec, it follows that any phosphor particles excited in one sweep will not be emitting when they are hit by the beam on the next sweep. In turn, as explained previously, since the photochromic materials respond to excitation very rapidly (as fast as 10 nsec) but decay relatively slowly ($\tau_m = 3$ to 20 sec.), the pulsed excitation at 10X intensity leads to a depth of color equal to and generally greater than that achieved by steady-state excitation at unit intensity. The net result of all this is an increase in the useful life of the phosphor. A tube lifetime of 1,000 hours is thus possible.

Comparison with Spiropyran P.C. Film.

There is known a data-display system which employs a Violet-U.V. phosphor (P-16), a fiber optic face plate, dichroic filter, P.C. film, and white-light projection system. The P.C. film employed is a spiropyran prepared by American Cyanamid Company. This P.C. film changes from colorless to blue on activation, and because bond rupture and repair are involved in these steps, certain energies of activation are necessary for these reversals; therefore, these processes have rather marked temperature coefficients. At too low a temperature there exists the possibility of generating the colored species irreversibly. On the other hand, the materials employed in the P.C. resin in the present invention work by mechanisms involving rearrangements of electrons and are affected very little by temperature changes. Because the rate of the reverse reaction is low for the spiropyran P.C. film, very little of the incident energy of excitation is wasted if it is absorbed. However, the rate at which color can be generated is also a factor controlling the variety of applications for which the film can be employed. For radar display in the dark-trace C.R.T. mode, it is anticipated that the P.C. resin materials of the invention would out-perform the spiropyran P.C. film in speed of response, speed of decay, contrast ratio on luminosity scale, and longevity. The speed of response will enable applications in radar displays where spiropyran P.C. film is not fast enough. Also, for viewing in the dark or in very dim light, the inventive P.C. resin can behave as a bright-trace C.R.T. simply by turning off the lights.

Effect of Temperature.

The P.C. resin materials are not generally affected by temperature and have been found operable at 100° C. (212° F.). In general, the lower the temperature, the greater is the degree of color developed from a given flux. However, at reduced temperatures, the color generated still decays unimolecularly after excitation ceases; it is not locked in. Here also, there is a marked contrast with the P.C. spiropyran materials which are irreversible at low temperatures.

Summarization.

The foregoing discussion has presented pertinent operational characteristics peculiar to representative samples of a certain class of photochromic materials. The chief characteristics are:

1. Fast change from initial colorless state to transient colored state.
2. Spontaneous decay of the colored form to the original colorless form.
3. Colored form not bleached by white light.
4. Variety of colors available.
5. Mixtures can be employed to obtain a gray color.
6. The P.C. resin layer (0.5–1 mm thick) could be used inside the vacuum cavity of a C.R.T. with U.V. phosphor to make a dark-trace C.R.T.
7. Contrast Ratios of 4 to 6 can be generated in several seconds at flux levels of 8–10 mW/cm² of 365 nm radiation.
8. Mean-life decay constants (1/e) of 3 to 16 seconds are typical.
9. If desirable, decay times can be made longer or shorter by altering the P.C. material or the resin.
10. Reversible and workable at temperatures as high as 100° C.; color not "frozen in" at low temperature.
11. The P.C. resin can probably outlast the U.V. phosphor.
12. Because build-up of color is much faster than the decay, it is possible to pulse the electron beam and thereby lengthen the useful life of the U.V. phosphor.
13. Could be used as a bright trace C.R.T. in the dark by means of visible light emitted during decay process.

FIGS. 7 to 18

The data presented demonstrate the performance characteristics manifested by four different photochromic resin samples nominally 0.045 cm thick sandwiched between glass plates 1 mm thick when exposed to U.V. light (Hg λ365 nm) at flux levels ranging from 1.3 to 21 mW/cm². The data are plotted as:

a. Contrast ratio vs log exposure at 21 mW/cm²
b. Contrast ratio vs exposure at five different levels of flux
c. Contrast ratio vs flux for six different exposure times (for only 1 sample)
d. Contrast ratio at steady-state vs flux (for four different samples)
e. Contrast ratio vs seconds of decay after reaching steady state (for four different samples)

As stated previously, the samples for FIGS. 7 to 18 were not optimized for this type of excitation. Thus, for example, by putting two layers of a given sample in series, contrast ratios for all samples were increased by factors ranging from as low as 1.23X to as large as 2.47X.

| Sample | $\tau m^{(sec)}$ | Color to Eye, Activated | Leaks | Gain in C.R. by Doubling Thickness |
|---|---|---|---|---|
| DDBA (Ex. 4a) | 54. | Red-Magenta | R-b-v | 2.47× |
| DFTF (Ex. 4b) | 2.9 | Magenta | R-BV | 1.23× |
| Binary Mixture (Ex. 4c) | 15.0 | Red-Lilac | R-b | 1.25× |
| Ternary Mixture (Ex. 4d) | 15.5 | Gray | | 1.35× |

¹ The mean lifetime, τ m, is the exponential decay constant for a given sample and is the time required for the concentration of colored transient molecules to fall to (1/e)th of the concentration at some arbitrary starting time, $t_o$. The same thing is true for the change in optical density of the sample with time after shutting off U.V. However, since optical density = log (1/T) = log (C.R.), the values of τ m as given, are the times required for these functions to fall to 37% of the values at $t_o$.

EXAMPLE 6

Increasing $\Phi_T$ at the Expense of $\Phi_F$

When looking at the display of a dark-trace CRT obtained by using a UV phosphor in conjunction with a T'—T PC resin, the astute observer will normally be aware of a certain amount of blue emission attributable to visible emission from the UV phosphor and fluorescence resin. This can be eliminated by placing a yellow, or preferably yellow-green, filter over the entire outer face of the PC resin sample or the CRT face plate. In the event such a filter cannot be employed for any reason whatsoever, the fluorescence emission from the T'—T PC resin can be largely eliminated in the following manner. The polynuclear aromatic hydrocarbon was reacted with

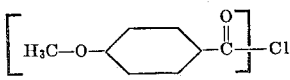

in a Friedel-Crafts reaction so that the group in brackets replaces one hydrogen or deuterium atom of the polynuclear aromatic hydrocarbon. When this was done with 1,2-5,6-dibenz-anthracene, $\Phi_F$ was lowered from 0.09 to 0.002 so that $\Phi T = 1 - \Phi_F$ is raised from 0.91 to 0.998 while $\tau_m$ is lowered from 1.45 seconds to 0.67 seconds for the non-deuterated hydrocarbon. In the case of 1,2-4,5-dibenzopyrene, 0.09 to 0.016; 0.91 to 0.984; and 0.60 seconds to 0.35 seconds, respectively.

EXAMPLE 7

Information Display Using a Scanned Laser Beam with T'—T PC Resin

A laser using helium and cadmium was employed which provides about 5 mw of λ 325 nm photons ($6 \times 10^{-12}$ erg / quantum). The area of the unfocused circular beam was about 0.05 cm² so that the flux available was about $1 \times 10^6$ ergs/cm². sec. or $1.66 \times 10^{17}$ quanta/cm².sec., unfocused, which is about 16.6 times the total UV flux of normal bright sunlight below 400nm. By using high quality optical devices, the diffraction-limited focused beam had a diameter of about $1 \mu = 1 \times 10^{-4}$ cm thereby achieving a flux of about $1 \times 10^{24}$ quanta/cm². sec., a gain of $5.8 \times 10^6$ X which is greater than the total UV flux of sunlight below 400nm by a factor of $10^8$. In front of the laser, in the unfocused parallel beam path, were placed two linear polarizing prisms made of crystalline $NH_4H_2PO_4$ oriented so as to achieve minimum transmission at 325 nm. Between the prisms, was placed a specially cut and polished plano-parallel plate of crystalline $KD_2PO_4$ whose two principal faces are rendered relatively conductive by means of transparent electrodes. The plate is oriented so as to transmit linearly polarized light with no change in the direction of polarization when the electric field is off. However, when the field is applied, the crystalline plate becomes biaxial and produces a rotation of the plane of polarization of the beam either right or left depending on the direction of the field. The degree of rotation depends on the magnitude of the field applied, and by varying the voltage, a continuous variation in the intensity of the light transmitted by the system is achieved. Additional details of such a light modulation system are described in a paper by B.H. Billings, J. Opt. Soc. Am., 39, 802–808(1949). After the beam is passed through the light filter, it is focused by a quartz-LiF-quartz triple lens, and then reflected by two multiple flat mirrors, each of which consists of a hexagonal "bar" with flat front surface mirrors on each face, onto the T'—T PC resin. The axes of rotation of the two hexagonal bars are mutually perpendicular and serve to produce an X-Y scan of the focused laser beam on the PC resin plate which was about 2"×2" square and 0.05 cm thick. The side of the resin facing the laser was provided with a fused quartz plate 1.5mm thick which in turn had an evaporated dechroic mirror face next to the resin. The other face of the resin was bonded to a piece of yellow glass 1.5mm thick capable of absorbing light having wavelengths below about 430nm. The periphery of the PC sandwich was coated with polyvinyl alcohol to exclude molecular oxygen. An external white light source and suitable accessories were used to provide a projection system so that an enlarged image of the trace generated by the intensity-modulated and scanned laser beam can be viewed comfortably.

The T'—T PC samples imaged in this way were:

a. 1,2-5,6-dibenzanthracene (90%D) in Lexan polycarbonate ($5 \times 10^{-3}$M/L), which became a deep pink color.

b. A mixture containing three components in Lexan polycarbonate: 2-phenyltriphenylene (70%D), $1 \times 10^{-3}$M/L; 1,2-3,4-5,6-tribenzanthracene (90%D), $1 \times 10^{-3}$M/L; Picene (90%D), $1 \times 10^{-3}$M/L. This sample became gray.

It will be obvious that many applications of the inventive device could be made. For example, with suitable means, it could be used to show real time holographic images.

While certain specific embodiments and preferred modes of practice have been set forth, it will be obvious that various modifications may be made in the invention without departing from the spirit of the disclosure and the scope of the appended claims.

I claim:

1. An information display screen viewable in high ambient light and darkness comprising a photochromic material capable of forming a dark trace and a luminescent trace, selected from the group consisting of polynuclear aromatic hydrocarbons and nitrogen containing heterocyclic compounds, said photochromic material being molecularly dispersed in a rigid, transparent matrix, said photochromic compound being activated by radiation within a certain band of frequencies, and a means capable of irradiating said screen within said band of frequencies.

2. The display screen of claim 1 wherein said means is an ultra-violet emitting phosphor.

3. The display screen of claim 1 wherein said means is a laser emitting in the ultra-violet range.

4. The display screen of claim 1 wherein said photochromic compound is self erasable.

5. A display system as in claim 3 including means to provide an X-Y scan of said laser beam, and means to modulate the intensity of said beam.

6. The display screen of claim 1 wherein said photochromic compound is deuterated.

* * * * *